(12) United States Patent
Kishigami et al.

(10) Patent No.: US 9,217,790 B2
(45) Date of Patent: Dec. 22, 2015

(54) RADAR APPARATUS

(75) Inventors: Takaaki Kishigami, Tokyo (JP); Yoichi Nakagawa, Tokyo (JP); Hirohito Mukai, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 322 days.

(21) Appl. No.: 13/818,463

(22) PCT Filed: Aug. 16, 2011

(86) PCT No.: PCT/JP2011/004590
§ 371 (c)(1),
(2), (4) Date: Feb. 22, 2013

(87) PCT Pub. No.: WO2012/029241
PCT Pub. Date: Mar. 8, 2012

(65) Prior Publication Data
US 2013/0147655 A1    Jun. 13, 2013

(30) Foreign Application Priority Data

Sep. 1, 2010  (JP) .................................. 2010-195971

(51) Int. Cl.
*G01S 13/28* (2006.01)
*G01S 13/00* (2006.01)
*G01S 13/93* (2006.01)

(52) U.S. Cl.
CPC .............. *G01S 13/284* (2013.01); *G01S 13/288* (2013.01); *G01S 13/931* (2013.01)

(58) Field of Classification Search
CPC ......... G01S 13/02; G01S 13/06; G01S 13/08; G01S 13/10; G01S 13/26; G01S 13/28; G01S 13/282; G01S 13/284; G01S 13/286; G01S 13/288; G01S 13/30; G01S 13/32; G01S 13/325; G01S 13/88; G01S 13/93; G01S 13/931

USPC ........... 342/27, 28, 59, 70–72, 118, 128–147, 342/175, 192–197, 200–204, 189
See application file for complete search history.

(56) References Cited

U.S. PATENT DOCUMENTS 4,353,067 A * 10/1982 Mims ........................... 342/201
4,513,288 A *  4/1985 Weathers et al. ............. 342/201
(Continued)

FOREIGN PATENT DOCUMENTS

EP    1 457 789 A2    9/2004
JP    61-96482 A  *  5/1986 ................... 342/194
(Continued)

OTHER PUBLICATIONS

International Search Report, mailed Nov. 8, 2011, for International Application No. PCT/JP2011/004590, 4 pages.

*Primary Examiner* — Bernarr Gregory
(74) *Attorney, Agent, or Firm* — Seed IP Law Group PLLC

(57) ABSTRACT

A radar apparatus transmits a high-frequency transmission signal, and receives a signal of a reflective wave reflected by a target. Given a first code sequence of a first code length, a second code sequence of a second code length which is longer than the first code sequence, and a third code sequence obtained by inverting each code of the first code sequence, a first transmission signal obtained by modulating the first code sequence, a second transmission signal obtained by modulating the second code sequence, a third transmission signal obtained by modulating the third code sequence and a fourth transmission signal obtained by modulating the second code sequence are generated in a first transmission period, a second transmission period, a third transmission period and a fourth transmission period respectively.

20 Claims, 16 Drawing Sheets

(56) References Cited

U.S. PATENT DOCUMENTS

| | | | |
|---|---|---|---|
| 5,151,702 A | | 9/1992 | Urkowitz |
| 5,192,956 A | * | 3/1993 | Lee ................................ 342/204 |
| 5,440,311 A | * | 8/1995 | Gallagher et al. ............ 342/132 |
| 5,786,788 A | | 7/1998 | Schober et al. |
| 5,841,813 A | * | 11/1998 | van Nee ........................ 342/201 |
| 6,864,834 B2 | * | 3/2005 | Walton .......................... 342/195 |
| 6,917,327 B2 | * | 7/2005 | Jenkins ......................... 342/202 |
| 7,151,483 B2 | * | 12/2006 | Dizaji et al. ................... 342/201 |
| 7,535,408 B2 | * | 5/2009 | Kuhn ............................ 342/129 |
| 7,714,777 B2 | * | 5/2010 | Fukuda ......................... 342/175 |

2004/0178952 A1    9/2004    Jenkins

FOREIGN PATENT DOCUMENTS

| | | |
|---|---|---|
| JP | 01-303135 A | 12/1989 |
| JP | 02-165086 A | 6/1990 |
| JP | 04-127054 A | 4/1992 |
| JP | 04-289453 A | 10/1992 |
| JP | 06-138215 A | 5/1994 |
| JP | 10-268040 A | 10/1998 |
| JP | 2004-271529 A | 9/2004 |

* cited by examiner

FIG. 4
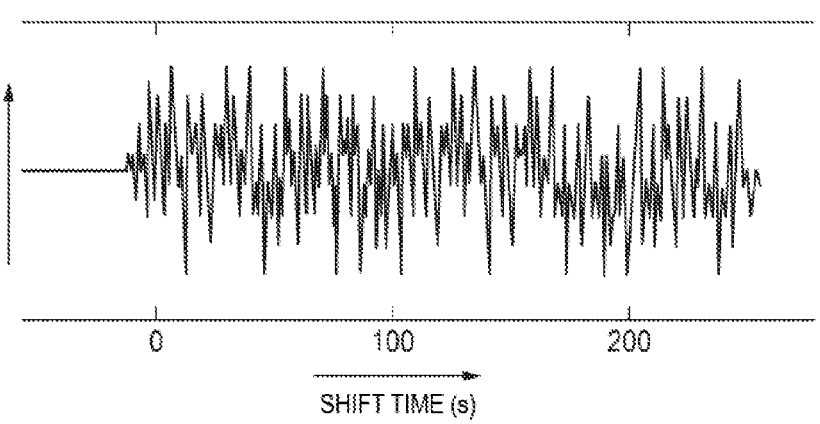
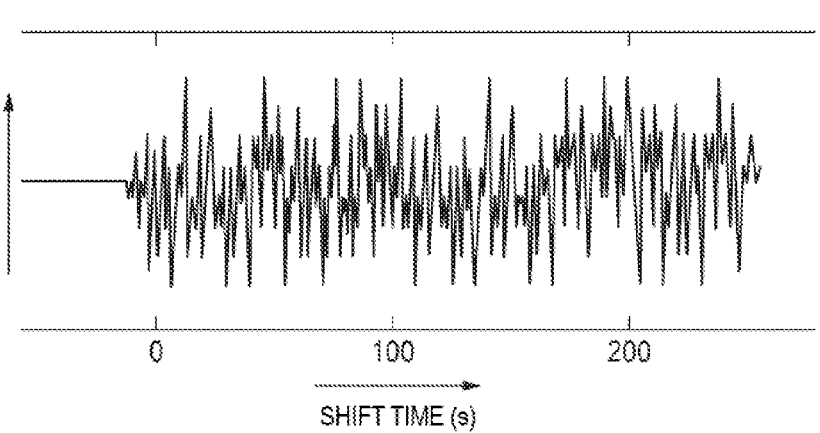
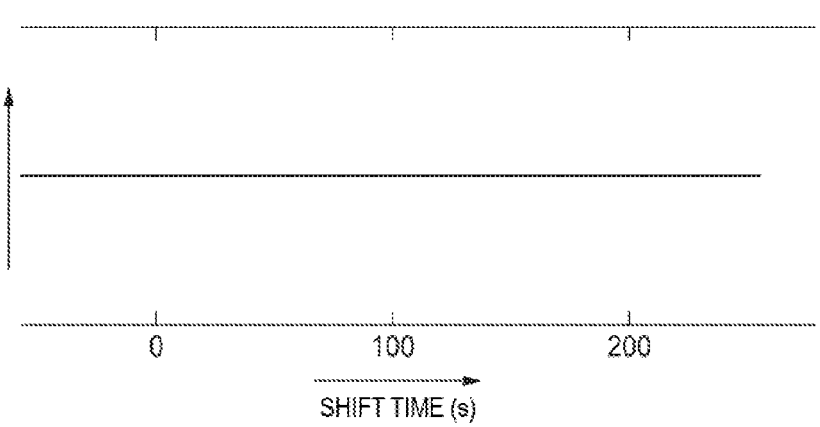

FIG. 13

```
Method for generating complementary codes a and b having a code length L = 2^P:

a=[1  1];  b=[1  −1];

for ii=1:P−1
    c=a;
    d=b;
    a=[c  d];%  Connection of the subcodes a and d
    b=[c  −d];%  Connection of the subcodes a and −d, −d being obtained by
              multiplying each element of the subcode d by −1.
end
```

RADAR APPARATUS

BACKGROUND

1. Technical Field

The present invention relates to a radar apparatus which detects a target by receiving a signal of reflection waves reflected by the target with an antenna.

2. Description of the Related Art

Radar apparatuses are devices for measuring a distance between a target and a measuring place, a direction of the target from the measuring place, and other items by radiating radio waves to the space from the measuring place and receiving a signal of reflection waves reflected by the target. In particular, in recent years, radar apparatuses which can detect targets including not only automobiles but also pedestrians etc. by a high-resolution measurement using short-wavelength radio waves such as microwaves or millimeter waves have been being developed.

There may occur a case that a radar apparatus receives a signal that is a mixture of reflection waves coming from a nearby target and reflection waves coming from a distant target. In particular, where range sidelobes occur due to the autocorrelation characteristic of a signal of reflection waves coming from a nearby target, a reception signal of a radar apparatus includes these range sidelobes and a main lobe of reflection waves coming from a distant target in mixture, as a result of which the accuracy of detection of the distant target is lowered in the radar apparatus.

When an automobile and a pedestrian are located at the same distance from a measuring place, a radar apparatus may receive a signal that is a mixture of signals of reflection waves coming from the automobile and the pedestrian which have different radar cross sections (RCSs). It is said that in general the radar cross section of a pedestrian (human) is smaller than that of an automobile. Therefore, radar apparatuses are required to properly receive not only reflection waves coming from an automobile but also reflection waves coming from a pedestrian even if they are located at the same distance from a measuring place.

Therefore, radar apparatuses which are required to be able to perform a high-resolution measurement on plural targets as mentioned above are also required to transmit pulse waves or pulse modulation waves having such a characteristic that range sidelobe levels are made lower (hereinafter referred to as a low range sidelobe characteristic). Such radar apparatuses are further required to have a wide reception dynamic range for a reception signal.

In connection with the above-described low range sidelobe characteristic, pulse compression radars are known which transmits pulse waves or pulse modulation waves which use a complementary code and have a low range sidelobe characteristic. The pulse compression is a method of transmitting a signal having a large pulse width obtained by pulse-modulating or phase-modulating a pulse signal and demodulating a received signal into a signal having a narrow pulse width in post-reception signal processing. The pulse compression can make it possible to increase the target detection distance and increase the detection distance estimation accuracy.

The complementary code is a code which comprises plural (e.g., two) complementary code sequences $(a_n, b_n)$ (parameter $n=1, 2, \ldots, L$). The complementary code has a property that range sidelobes are made zero when autocorrelation calculation results, equalized in a shift time $\tau$, of the one complementary code sequence $a_n$ and the other complementary code sequence $b_n$ are added together. The parameter L represents a code sequence length or merely a code length.

A complementary code generating method will be disclosed with reference to FIG. 13. FIG. 13 is an explanatory diagram showing a procedure for generating general complementary code sequences. As shown in FIG. 13, subcode sequences (c, d) having elements "1" and "−1" and a pulse code length $L=2^{p-1}$ are generated according to the statements on lines 4 and 5 and complementary code sequences (a, b) having a pulse code length $L=2^p$ are further generated according to the statements on lines 6 and 7. The one complementary code sequence a is a connection of the subcode sequences c and d. The other complementary code sequence b is a connection of the subcode sequences c and −d.

The symbol (a, b) represents the complementary code sequences and (c, d) represents the subcode sequences constituting each complementary code sequence. The parameter p determines the code length L of the generated complementary code sequences (a, b).

Characteristics of the above complementary code will be described with reference to FIG. 14. FIG. 14 is explanatory diagrams showing characteristics of a conventional complementary code. In FIG. 14, (a) is an explanatory diagram showing an autocorrelation calculation result of the one complementary code sequence $a_n$. In FIG. 14, (b) is an explanatory diagram showing an autocorrelation calculation result of the other complementary code sequence $b_n$. In FIG. 14, (c) is an explanatory diagram showing addition values of the autocorrelation calculation results of the two respective complementary code sequences $(a_n, b_n)$. The code length L of the complementary code shown in FIG. 14 is equal to 128.

Between the two complementary code sequences $(a_n, b_n)$, an autocorrelation calculation result of the one complementary code sequence $a_n$ is calculated according to Equation (1). An autocorrelation calculation result of the other complementary code sequence $b_n$ is calculated according to Equation (2). The parameter R represents an autocorrelation calculation result. It is assumed that each of the complementary code sequences $a_n$ and $b_n$ is zero when $n>L$ or $n<1$ (i.e., $a_n=0$ and $b_n=0$ when $n>L$ or $n<1$). The asterisk * is a complex conjugate operator.

[Formula 1]

$$R_{aa}(\tau) = \sum_{n=1}^{L} a_n a_{n+\tau}^* \quad (1)$$

[Formula 2]

$$R_{bb}(\tau) = \sum_{n=1}^{L} b_n b_{n+\tau}^* \quad (2)$$

As shown in (a) in FIG. 14, the autocorrelation calculation result $R_{aa}(\tau)$ of the one complementary code sequence $a_n$ calculated according to Equation (1) has a peak when the shift time $\tau$ is equal to 0 and has range sidelobes for the shift time $\tau$ being not equal to 0. Likewise, as shown in (b) in FIG. 14, the autocorrelation calculation result $R_{bb}(\tau)$ of the other complementary code sequence $b_n$ calculated according to Equation (2) has a peak when the shift time $\tau$ is equal to 0 and has range sidelobes for the delay time $\tau$ being not equal to 0.

As shown in (c) in FIG. 14, the addition values of the autocorrelation calculation results $R_{aa}(\tau)$ and $R_{bb}(\tau)$ have a peak (in the following description, a peak occurring when the shift time $\tau$ is equal to 0 will be referred to as a main lobe) when the shift time (delay time) $\tau$ is equal to 0 and have no range sidelobes (i.e., have values 0) for the shift time $\tau$ being not equal to 0. This is expressed as Formulae (3). In FIGS. 14(a)-14(c), the horizontal axis represents the shift time τ which is used in the autocorrelation calculation and the vertical axis represents the calculated autocorrelation calculation result.

[Formulae 3]

$$R_{aa}(\tau)+R_{bb}(\tau)\neq 0, \text{ when } \tau=0$$

$$R_{aa}(\tau)+R_{bb}(\tau)=0, \text{ when } \tau\neq 0 \quad (3)$$

Next, a reception dynamic range of a pulse compression radar as an example of the above kind of radar apparatus when plural targets are detected by the pulse compression radar will be described with reference to FIG. 15. FIG. 15 is a conceptual diagram illustrating a reception dynamic range of a radar receiving unit when plural targets TR1, TR2, and TR3 are detected by a conventional pulse compression radar apparatus 1z. As shown in FIG. 15, the pulse compression radar apparatus 1z transmits a transmission signal having a pulse width Tp and a pulse compression code length L in such a manner as to continue transmission of a pulse sequence during a pulse sequence transmission interval T. Equation (4) holds between the pulse sequence transmission interval T, the pulse width Tp, and the pulse compression code length L:

[Formula 4]

$$T=Tp\times L \quad (4)$$

As shown in FIG. 15, assume that a target TR2 exists at a position having a distance R from the pulse compression radar apparatus 1z and targets TR1 and TR3 exist within a distance range [R−(cT/2), R+(cT/2)]. In this case, a (reflection) signal RS2 which is reflection waves coming from the target TR2 overlaps with (reflection) signals RS1 and RS3 which are reflection waves coming from the other targets TR1 and TR3 existing in the distance range [R−(cT/2), R+(cT/2)]. The parameter c is the speed of light (m/s).

Therefore, to suppress degradation of the distance measurement accuracy of the pulse compression radar apparatus 1z, a reception dynamic range is necessary which enables proper reception of each of the reception wave signals RS1-RS3 which come from the respective targets TR1-TR3 and include overlap portions. If the pulse compression radar apparatus 1z does not have a proper reception dynamic range, the peak level lowers and the range sidelobe level increases when pulse compression is done, resulting in reduction in the measurement accuracy of distances of the targets TR1-TR3.

In measurements by conventional radar apparatuses, the distance propagation loss is proportional to the forth power of the distance. Therefore, as the pulse compression code length L becomes greater, the processing gain of the pulse compression increases and the measurable distance range increases. However, as the pulse compression code length L becomes greater, the reception dynamic range that is necessary for reception increases. The radar equation produces a conclusion that a dynamic range that is necessary for reception of signals coming from plural nearby targets (within about 30 m) is wider than a dynamic range that is necessary for reception of signals coming from plural distant targets (more distant than about 30 m).

The distributed compression type pulse echo system transceiver disclosed in Patent document 1 is known as a device which relates to the above-described reception dynamic range, more specifically, a device which suppresses the reception dynamic range while increasing the measurable distance range.

This distributed compression type pulse echo system transceiver transmits, time-divisionally, high-frequency signals modulated according to pulse compression codes that are code sequences having different code lengths, respectively, in respective modes (B mode and Doppler mode). More specifically, in the B mode, this transceiver transmits a high-frequency signal for a short-distance range that is modulated according to a code (code sequence) having a short pulse code length. In the Doppler mode, this transceiver transmits a high-frequency transmission signal for a medium to long-distance range that is modulated according to a code (code sequence) having a large pulse code length. In this manner, different kinds of transmission pulses can be used according to the distance range of a measurement subject, whereby pulse echoes due to a nearby, fast-moving target can be reduced.

The testing instruments disclosed in Patent document 2 and 3 are known as testing instruments for completely eliminating interfering echoes by transmission signals generated using a complementary code.

This type of testing instrument generates plural transmission signals having a prescribed code length using complementary code sequences or plural auxiliary sequences and drives plural probes in predetermined order by these transmission signals. The testing instrument generates reference signals according to the code sequences by a reference signal generator. Furthermore, the testing instrument performs correlation processing on plural echoes received by the plural probes by a correlator using the plural reference signals, and adds processing results together. As a result, interfering echoes can be prevented from affecting a test result and the signal-to-noise ratio can be increased.

PRIOR ART DOCUMENTS

Patent Documents

Patent document 1: JP-A-10-268040
Patent document 2: JP-A-4-127054
Patent document 3: JP-A-4-289453
Summary of the Invention

BRIEF SUMMARY

Problems to be Solved by the Invention

However, as shown in (a) in FIG. 16, in the case where as disclosed in Patent document 1 a code sequence W having a short pulse code length and code sequences V1 and V2 having large pulse code lengths are transmitted at the same transmission cycle, a problem arises that the accuracy of a measurement that is to follow a moving target is lowered when the code sequence W is transmitted. FIG. 16 is explanatory diagrams showing example transmission cycles of the conventional distributed compression type pulse echo system transceiver disclosed in Patent document 1. In FIG. 16, (a) is an explanatory diagram showing a case that the short code sequence W and the long code sequences V1 and V2 are transmitted at the same transmission cycle. In FIG. 16, (b) is an explanatory diagram showing a case that the short code sequence W is transmitted at a shorter transmission cycle than the long code sequences V1 and V2.

As shown in (a) in FIG. 16, while the code sequence W for a short-distance range having the short pulse code length is transmitted, the code sequences V1 and V2 for a medium to long-distance range (out of the distance range concerned) having the long pulse code lengths are also transmitted at the same transmission cycle Tm as the former. Therefore, while the code sequence W for a short-distance range having the short pulse code length is transmitted, an extra time is consumed for a measurement in the other measurement distance range, that is, the medium to long-distance range, resulting in the above-described problem.

On the other hand, where as shown in (b) in FIG. 16 the transmission cycle Tn of the code sequence W for a short-distance range having the short pulse code length is shorter than the transmission cycle Tm of the code sequences V1 and V2 for the other, medium to long-distance range having the long pulse code lengths, a signal of reflection waves of the code sequence W concerned may be mixed into a signal in the next transmission cycle Tm. In this case, inter-code interference occurs between a signal of reflection waves of the code sequence W concerned having the short pulse code length and a transmission signal, in the next transmission cycle Tm, of the code sequence V1 having the long pulse code length, depending on their cross-correlation characteristic. As a result, the reception SNIR (signal to noise interference ratio, signal to noise plus interference power ratio) of the radar apparatus and hence its measurement accuracy is lowered.

In Patent document 2 or 3, it is assumed that plural transmission signals are generated using respective pulse compression codes having the same code length and that the transmission signals have the same transmission cycle. Therefore, the transmission signals are transmitted in the same manner as shown in (a) in FIG. 16, resulting in the above-described problem.

The present invention has been made in the above circumstances, and an object of the present invention is to provide a radar apparatus which makes a measurement time that is necessary for a measurement involving plural measurement distance ranges shorter than in conventional cases while increasing the measurement distance range by suppressing inter-code interference, if any, due to mixing of reflection waves of a transmission code having a short transmission cycle into a signal in the ensuing, long transmission cycle.

Means for Solving the Problems

The invention provides a radar apparatus of the above kind comprising a transmission signal generator for generating a first transmission signal in a first transmission cycle by modulating a first code sequence, generating a second transmission signal in a second transmission cycle by modulating a second code sequence, generating a third transmission signal in a third transmission cycle having the same length as the first transmission cycle by modulating a third code sequence which is obtained by inverting the sign of individual codes of the first code sequence, and generating a fourth transmission signal in a fourth transmission cycle by modulating the second code sequence; and an RF transmitter for converting the first, second, third, and fourth transmission signals generated by the transmission signal generator into respective high-frequency transmission signals, and transmitting the high-frequency transmission signals from a transmission antenna.

Advantageous Effects of the Invention

The radar apparatus according to the invention can make a measurement time that is necessary for a measurement involving plural measurement distance ranges shorter than in conventional cases while increasing the measurement distance range by suppressing inter-code interference, if any, due to mixing of reflection waves of a transmission code having a short transmission cycle into a signal in the ensuing, long transmission cycle.

BRIEF DESCRIPTION OF THE SEVERAL VIEWS OF THE DRAWINGS

FIG. 4 is explanatory diagrams showing a calculation result of cross-correlation between a transmission code A having a short code length and a transmission code B1 having a long code length; (a) in FIG. 4 shows a calculation result of cross-correlation between the transmission code A and the transmission code B1, (b) in FIG. 4 shows a calculation result of cross-correlation between the transmission code −A and the transmission code B1, and (c) in FIG. 4 shows an addition result of the calculation result of cross-correlation between the transmission code A and the transmission code B1 and the calculation result of cross-correlation between the transmission code —A and the transmission code B1.

Figure 9:
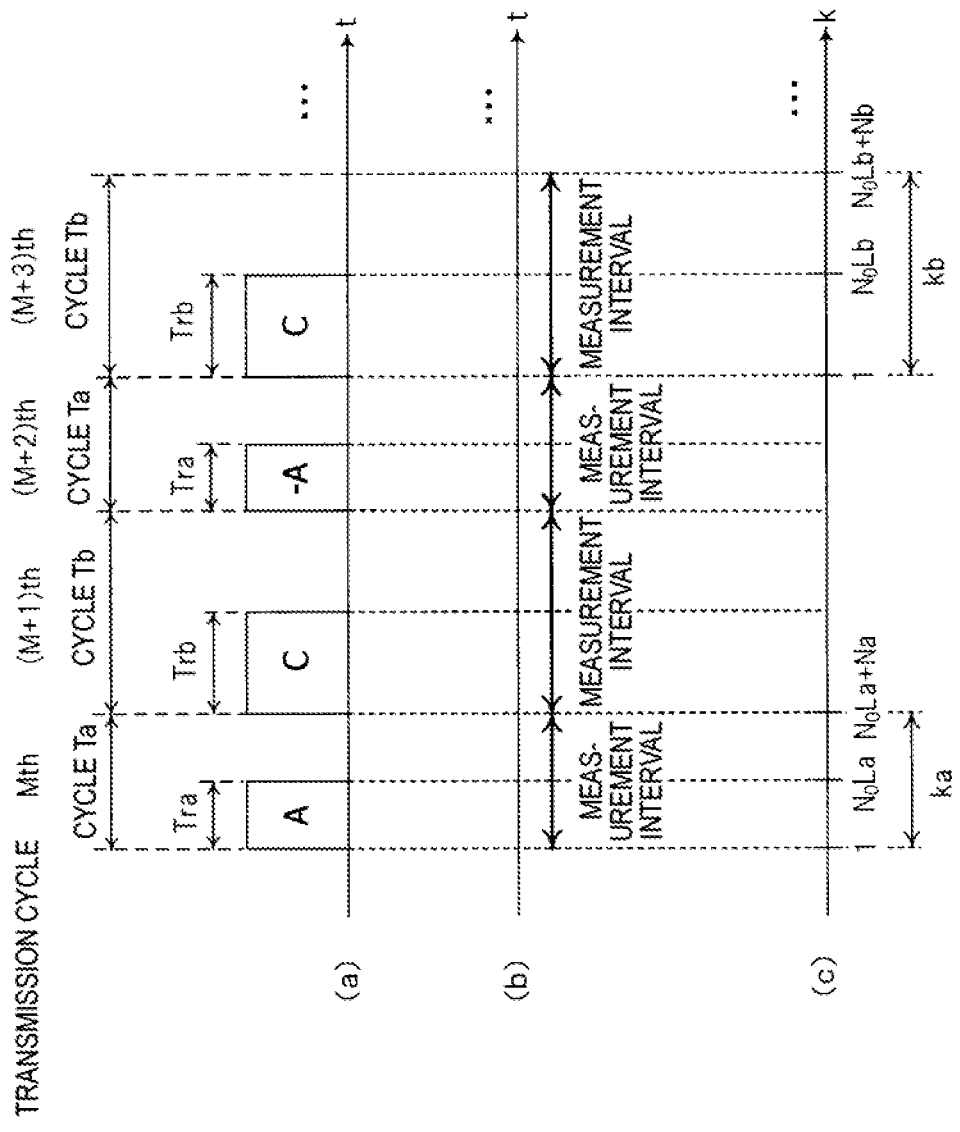
FIG. 9 is a timing chart illustrating how a radar apparatus of a first example operates in which a code sequence C that is not one of code sequences constituting a complementary code is used as a code sequence having a large code length; (a) in FIG.

9 is an explanatory diagram showing transmission cycles Ta, transmission cycles Tb, and transmission codes used in the respective transmission cycles, (b) in FIG. 9 is an explanatory diagram showing measurement intervals, and (c) in FIG. 9 is an explanatory diagram showing relationships between transmission cycles Ta and Tb and discrete times $k_a$ and $k_b$, respectively.

Figure 10:
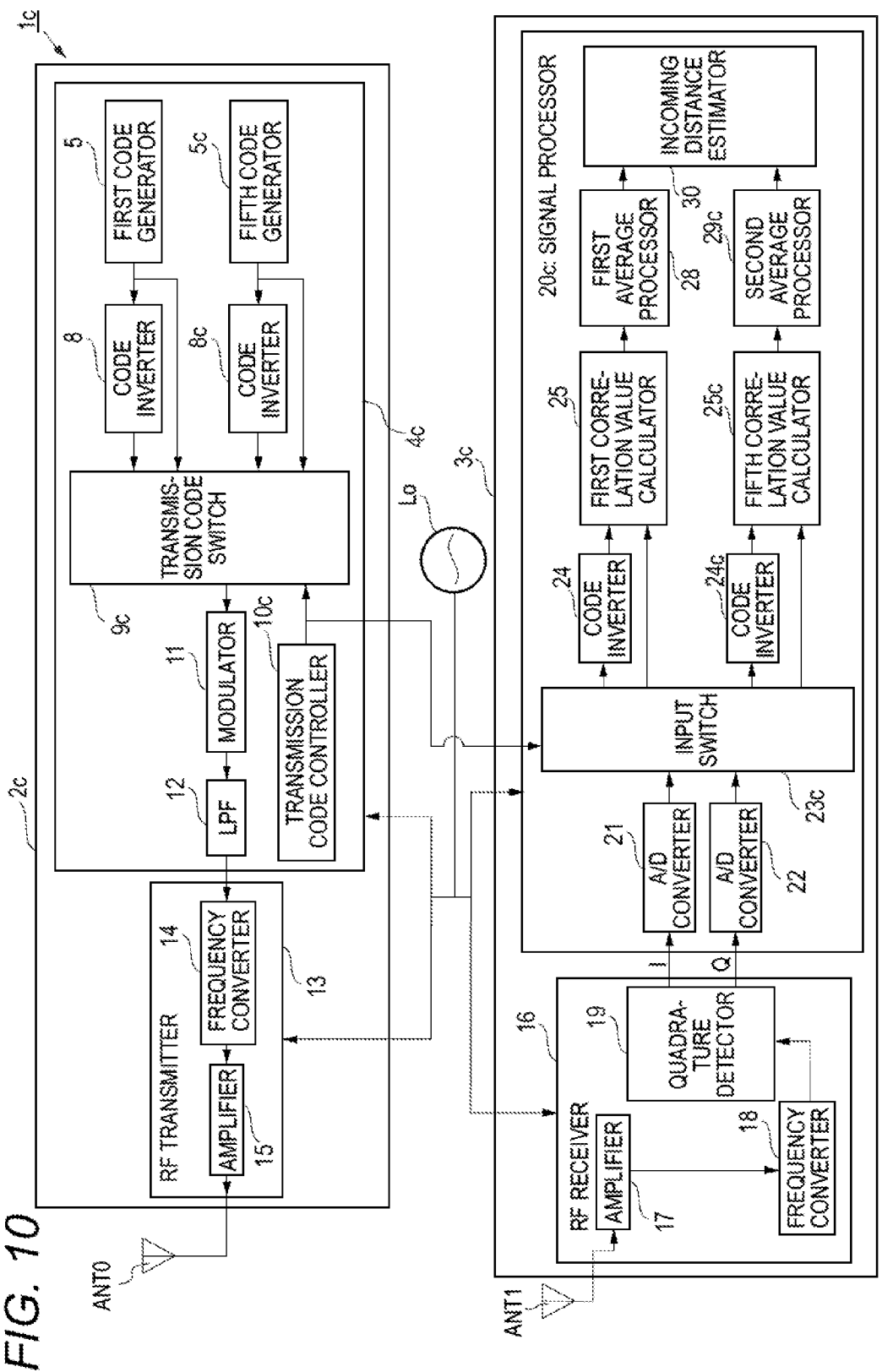

FIG. 10 is a block diagram showing the internal configuration of the radar apparatus of the first example in which a code sequence C that is not one of code sequences constituting a complementary code is used as a code sequence having a large code length.

Figure 11:
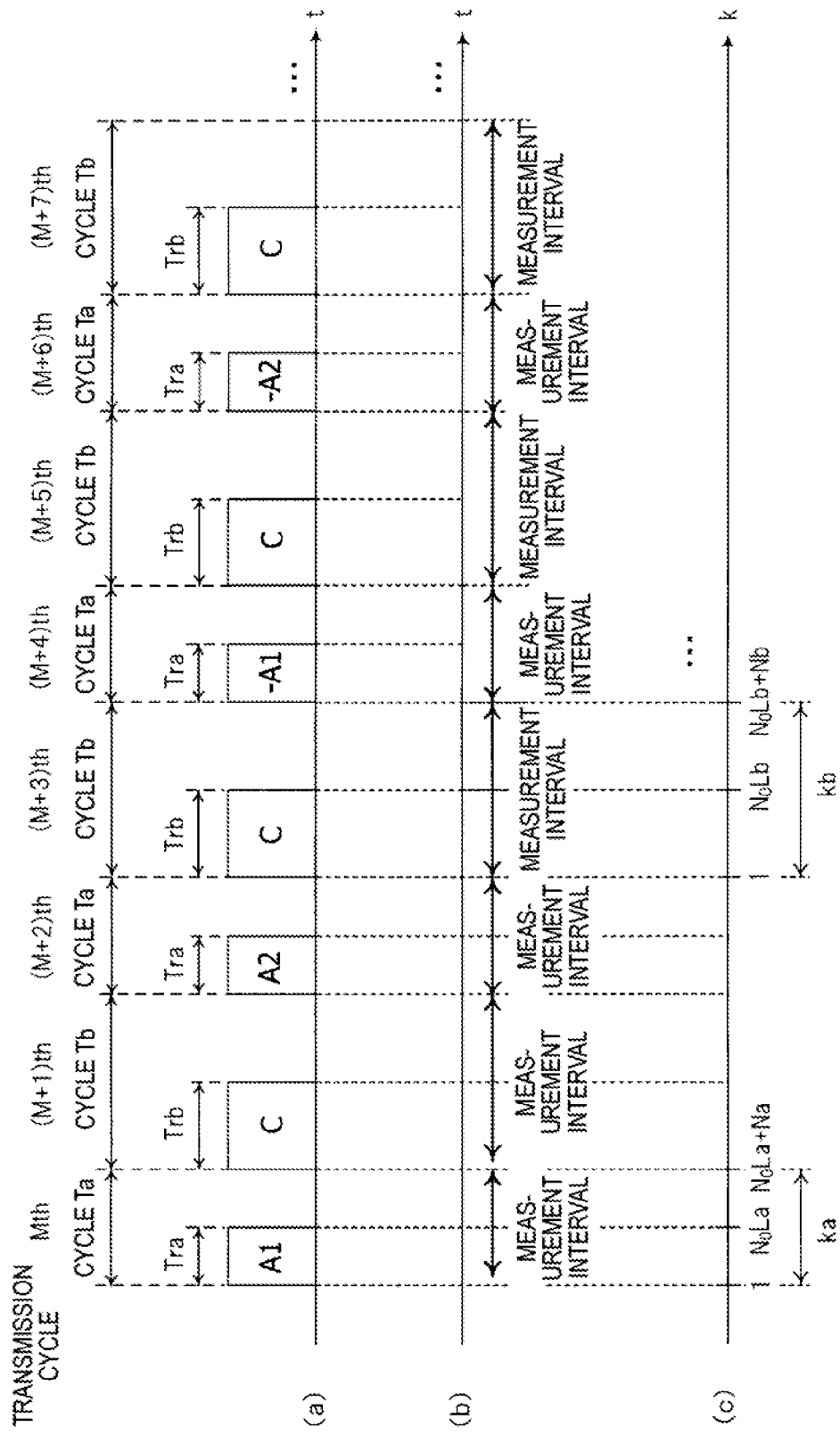

FIG. 11 is a timing chart illustrating how a radar apparatus of a second example operates in which a code sequence C that is not one of code sequences constituting a complementary code is used as a code sequence having a large code length; (a) in FIG. 11 is an explanatory diagram showing transmission cycles Ta, transmission cycles Tb, and transmission codes used in the respective transmission cycles, (b) in FIG. 11 is an explanatory diagram showing measurement intervals, and (c) in FIG. 11 is an explanatory diagram showing relationships between transmission cycles Ta and Tb and discrete times $k_a$ and $k_b$, respectively.

Figure 12:
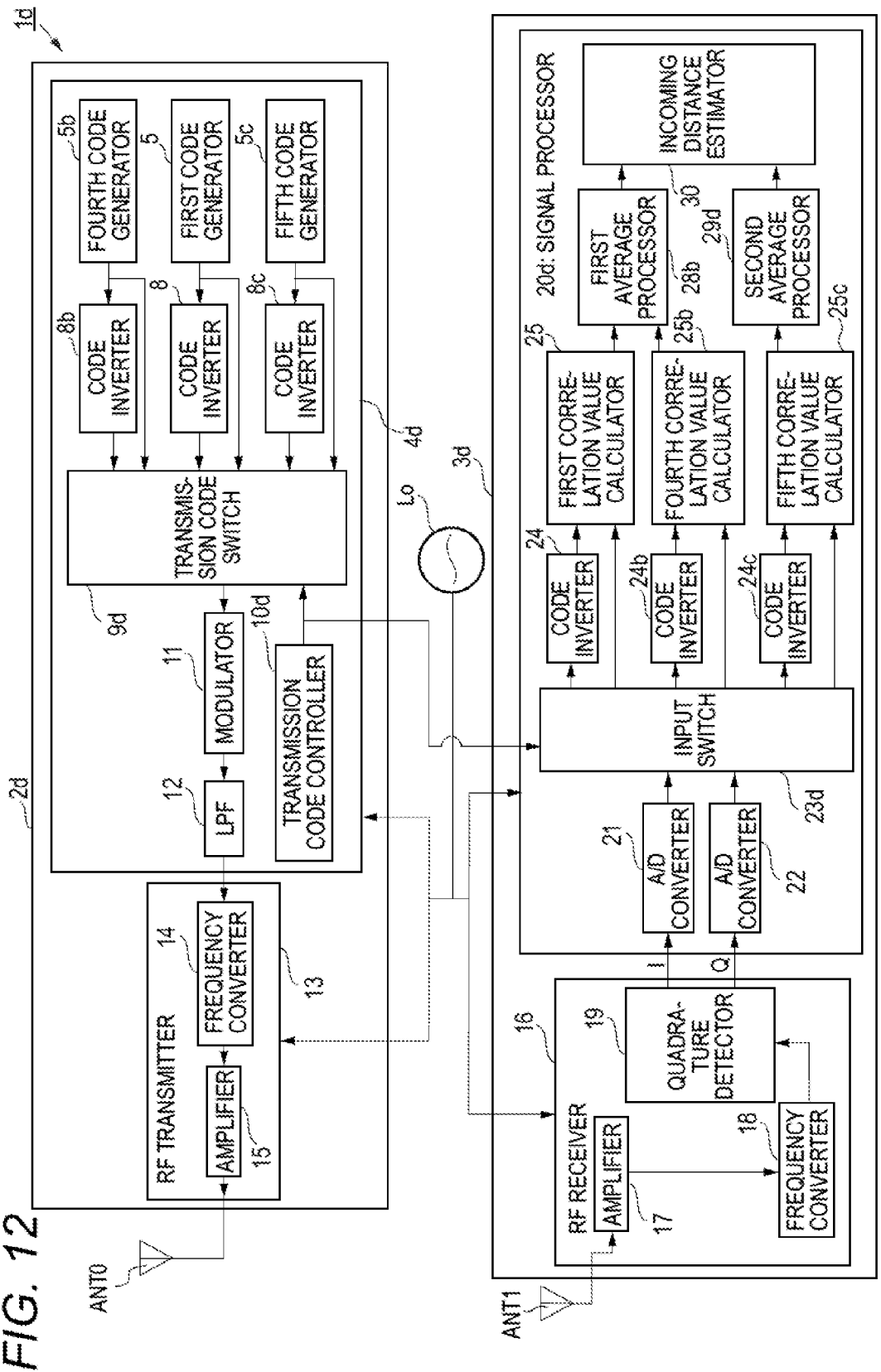

FIG. 12 is a block diagram showing the internal configuration of the radar apparatus of the second example in which a code sequence C that is not one of code sequences constituting a complementary code is used as a code sequence having a large code length.

FIG. 13 is an explanatory diagram showing a procedure for generating general complementary code sequences.

Figure 14:
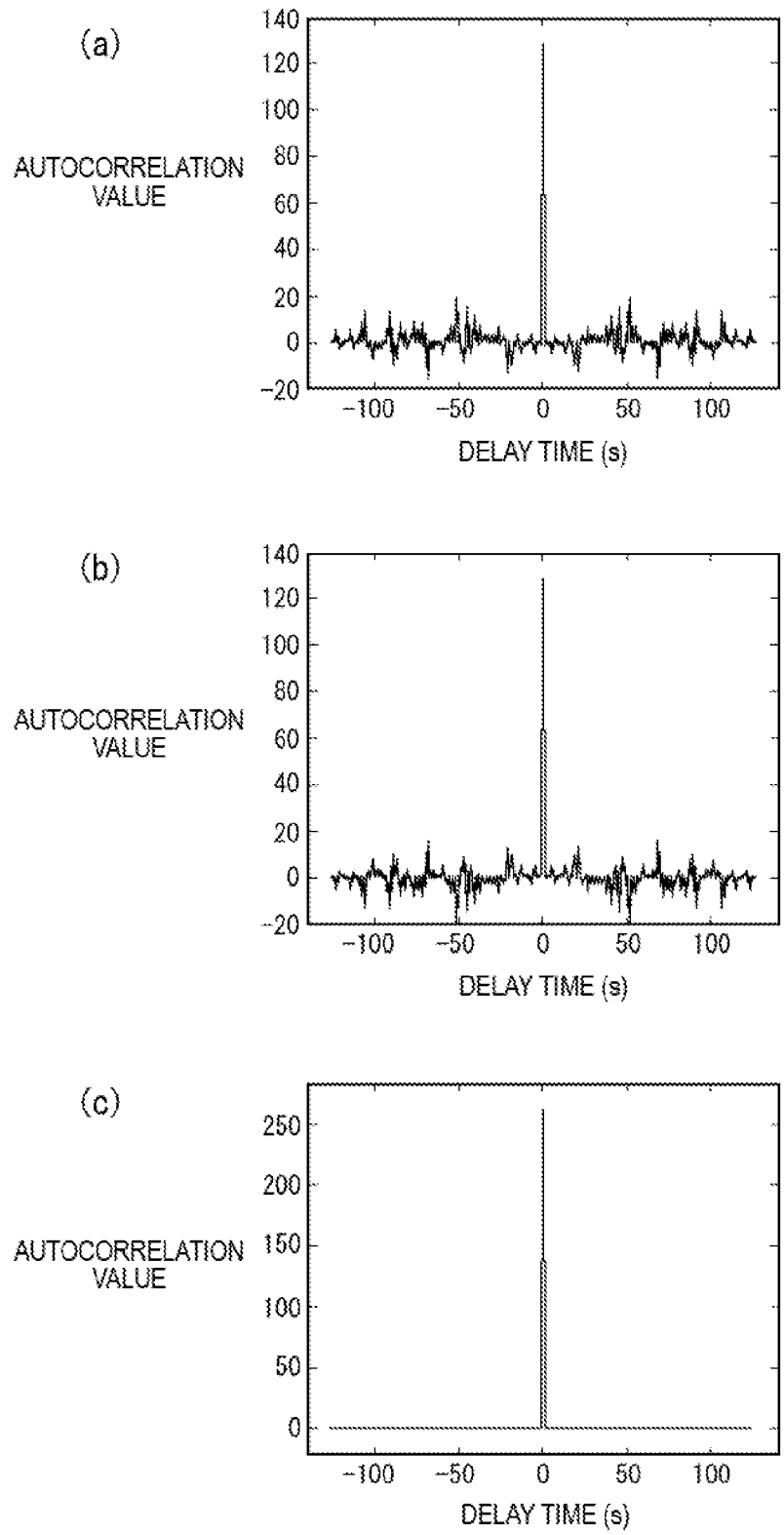

FIG. 14 is explanatory diagrams showing characteristics of a conventional complementary code; (a) in FIG. 14 is an explanatory diagram showing an autocorrelation calculation result of one complementary code sequence, (b) in FIG. 14 is an explanatory diagram showing an autocorrelation calculation result of the other complementary code sequence, and (c) in FIG. 14 is an explanatory diagram showing addition values of the autocorrelation calculation results of the two respective complementary code sequences.

Figure 15:
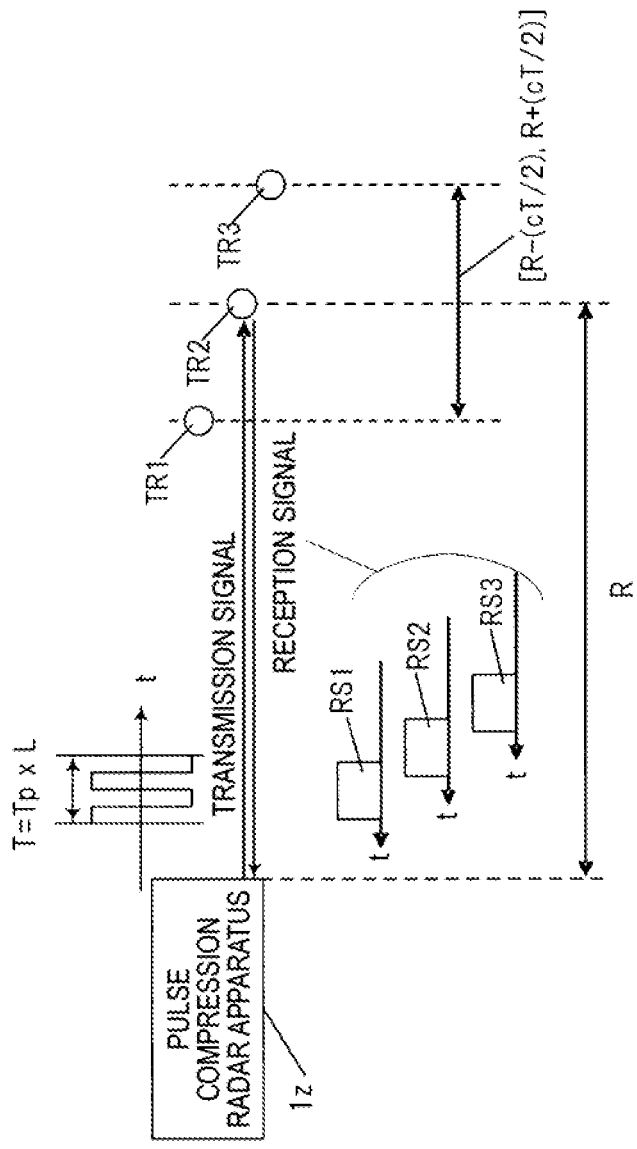

FIG. 15 is a conceptual diagram illustrating a reception dynamic range of a radar receiving unit when plural targets are detected by a conventional pulse compression radar.

Figure 16:
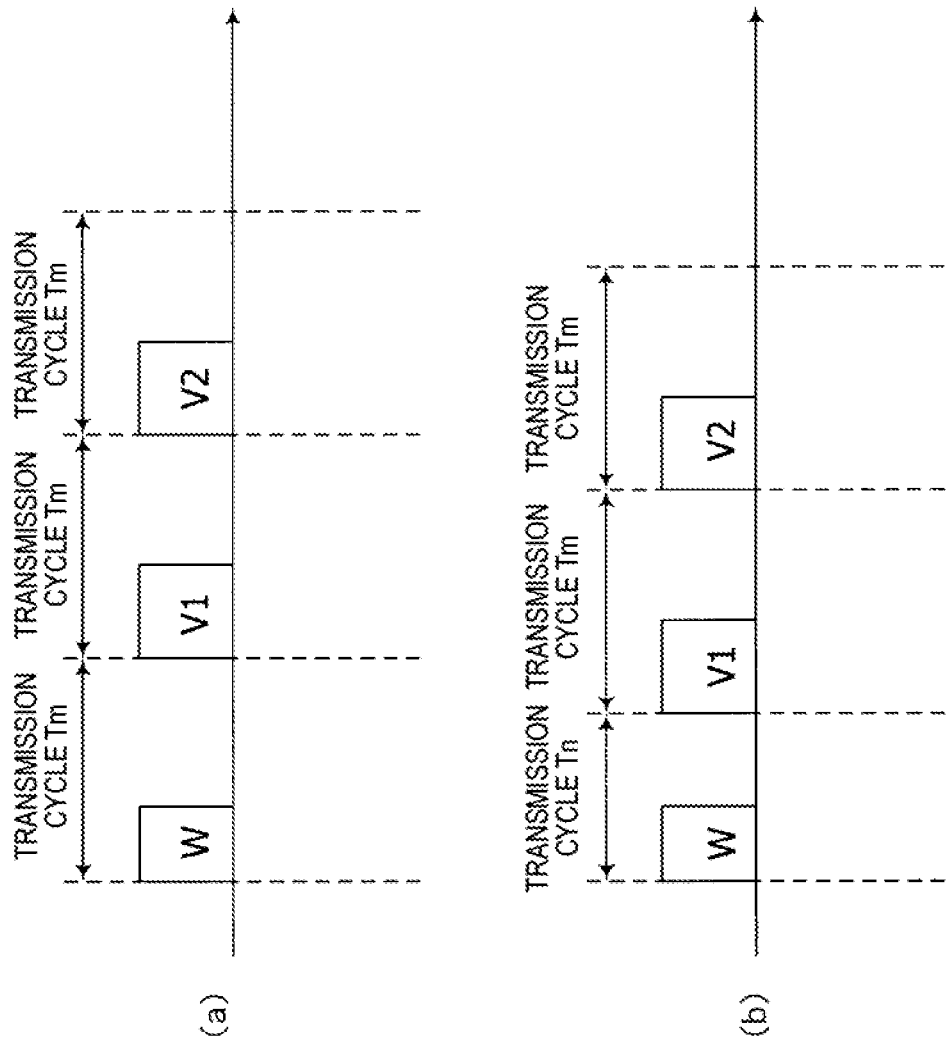

FIG. 16 is explanatory diagrams showing example transmission cycles of a conventional distributed compression type pulse echo system transceiver; (a) in FIG. 16 is an explanatory diagram showing a case that a short code sequence and long code sequences are transmitted at the same transmission cycle and (b) in FIG. 16 is an explanatory diagram showing a case that the short code sequence is transmitted at a shorter transmission cycle than the long code sequences.

DETAILED DESCRIPTION

Embodiments of the present invention will be hereinafter described with reference to the drawings. In a certain transmission cycle, a radar apparatus according to each of the following embodiments transmits a high-frequency signal for a short-distance range (i.e., for detection of a nearby target) that is pulse-modulated using a code sequence having a short code length. In another transmission cycle, the radar apparatus transmits a high-frequency signal for a long-distance range (i.e., for detection of a distant target) that is pulse-modulated using a code sequence having a long code length.

In the following description, a reception signal that is received by the radar apparatus includes a signal of reflection waves produced as a result of reflection, by a target, of a high-frequency signal transmitted from the radar apparatus and noise signals produced around the radar apparatus.

Embodiment 1

Figure 1:
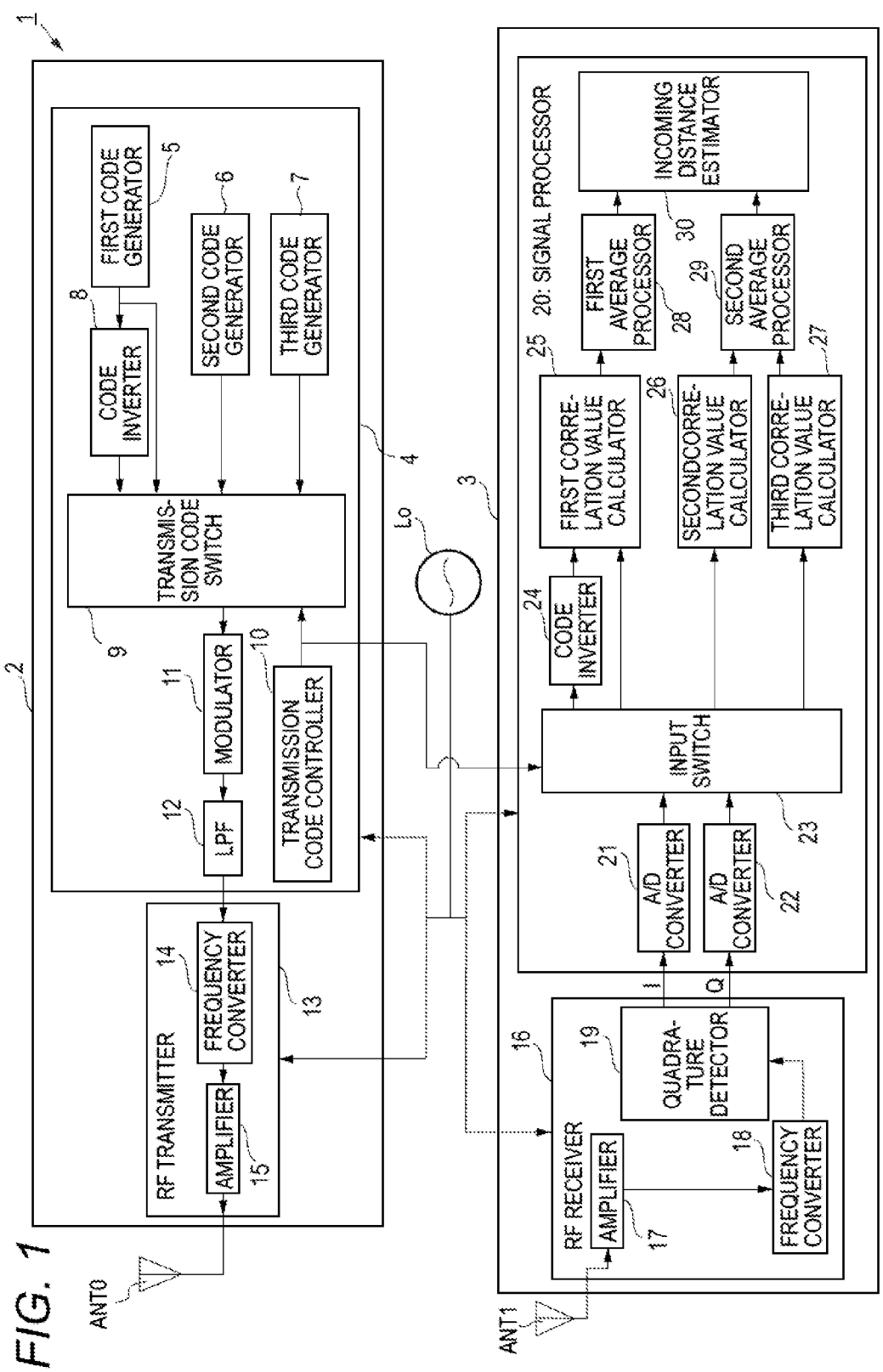
FIG. 1 is a block diagram showing the internal configuration of a radar apparatus according to a first embodiment.
Figure 2:
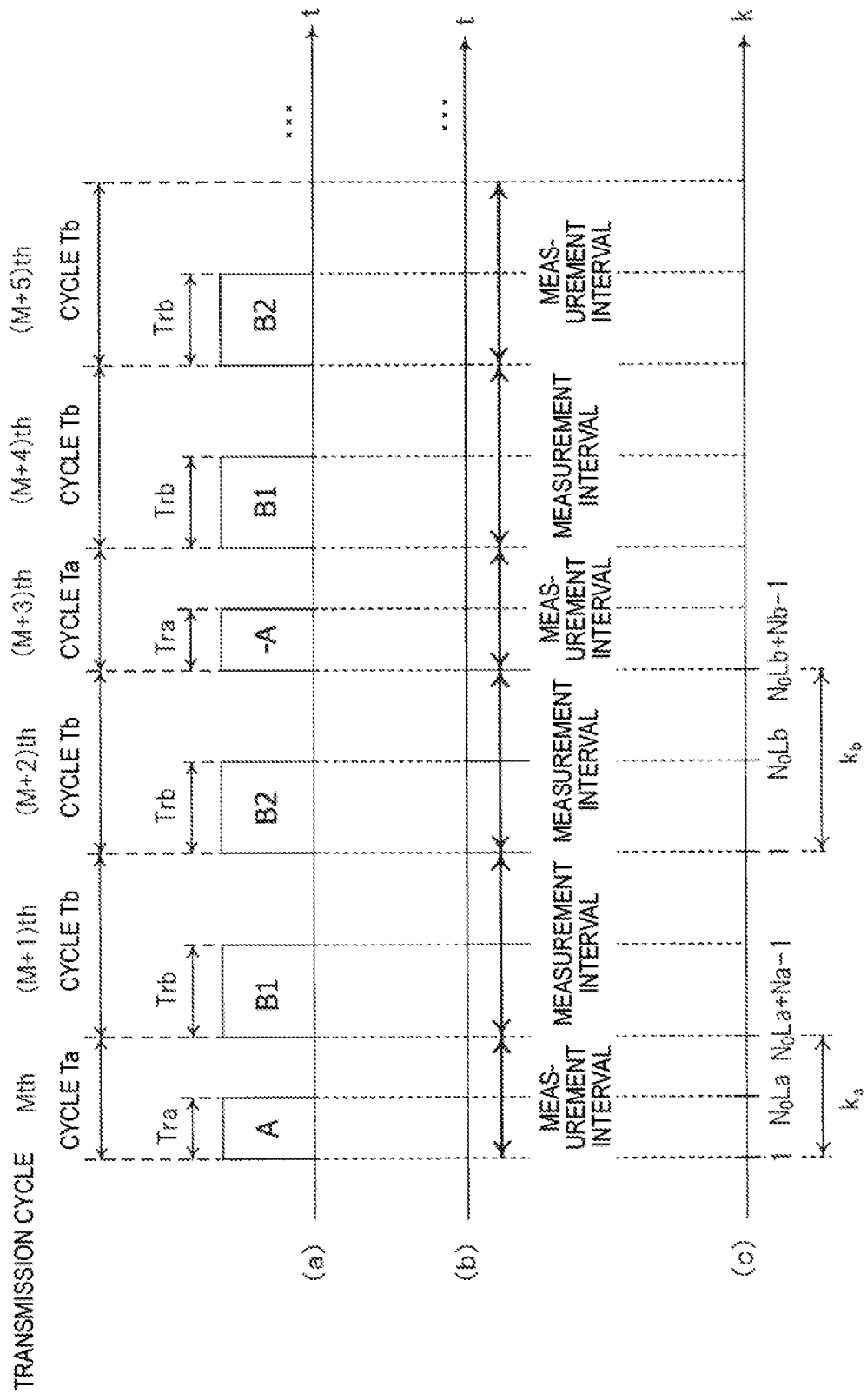
FIG. 2 is a timing chart illustrating how the radar apparatus according to the first embodiment operates; (a) in FIG. 2 is an explanatory diagram showing transmission cycles Ta, transmission cycles Tb, and transmission codes used in the respective transmission cycles, (b) in FIG. 2 is an explanatory diagram showing measurement intervals, and (c) in FIG. 2 is an explanatory diagram showing relationships between transmission cycles Ta and Tb and discrete times $k_a$ and $k_b$, respectively.

The configuration and operation of a radar apparatus 1 according to a first embodiment will be described with reference to FIGS. 1 and 2. FIG. 1 is a block diagram showing the internal configuration of the radar apparatus 1 according to the first embodiment. FIG. 2 is a timing chart illustrating how the radar apparatus 1 according to the first embodiment operates. In FIG. 2, (a) is an explanatory diagram showing transmission cycles Ta, transmission cycles Tb, and transmission codes used in the respective transmission cycles. In FIG. 2, (b) is an explanatory diagram showing measurement intervals. In FIG. 2, (c) is an explanatory diagram showing relationships between transmission cycles Ta and Tb and discrete times $k_a$ and $k_b$, respectively.

As shown in FIG. 1, the radar apparatus 1 is configured so as to include a reference oscillator Lo, a radar transmitter 2 to which a transmission antenna ANT0 is connected, and a radar receiver 3 to which a reception antenna ANT1 is connected. The radar apparatus 1 transmits prescribed intermittent high-frequency transmission signals generated by the radar transmitter 2 from the transmission antenna ANT0, and receives signals of reflection waves reflected from a target by the reception antenna ANT1. The radar apparatus 1 detects the target on the basis of reception signals received by the radar receiver 3. The target is an object to be detected by the radar apparatus 1 and is an automobile, a human, or the like. This also applies to each embodiment described below.

First, the radar transmitter 2 will be described. The radar transmitter 2 is configured so as to include a transmission signal generator 4 and a transmission RF (radio frequency) unit 13. The transmission signal generator 4 is configured so as to include a first code generator 5, a second code generator 6, a third code generator 7, a code inverter 8, a transmission code switch 9, a transmission code controller 10, a modulator 11, and an LPF (lowpass filter) 12. Although in FIG. 1 the transmission signal generator 4 is configured so as to include the LPF 12, the LPF 12 may be provided in the radar transmitter 2 independently of the transmission signal generator 4. The RF transmitter 13 is configured so as to include a frequency converter 14 and an amplifier 15.

The transmission signal generator 4 generates a signal by multiplying a reference signal generated by the reference oscillator Lo by a prescribed factor. The individual units of the transmission signal generator 4 operates according to the thus-generated signal. The transmission signal generator 4 switches among plural code sequences A, B1, and B2 having different pulse code lengths in units of a cycle that is equal to an integer (Za, Zb1, Zb2: natural number) multiple of each of two transmission cycles Ta and Tb. The code sequence A is used in each transmission cycle Ta, and the code sequence B1 or B2 is used in each transmission cycle Tb. It is assumed that the code sequences B1 and B2 have the same code length.

Furthermore, the transmission signal generator 4 generates elements of a baseband transmission signal r(n) periodically by modulating the thus-selected code sequence. The parameter n represents the discrete time. A parameter La represents a pulse code length of the code sequence A. A parameter Lb represents a pulse code length of each of the code sequences B1 and B2. The parameters La and Lb have a relationship La<Lb. The code sequences B1 and B2 are a pair of complementary code sequences (B1, B2).

It is assumed that the transmission signal generator 4 generates uncontinuous signals. For example, as shown in (a) of FIG. 2, in the transmission interval Tra (s) of an Mth (M: natural number) transmission cycle (transmission cycle Ta), $N_0$ samples exist per pulse code for the code sequence A having the pulse code length La. In the transmission interval Tra of an (M+3)th transmission cycle (transmission cycle Ta), $N_0$ samples exist per pulse code for the code sequence −A having the pulse code length La. It is assumed that Na samples exist as a baseband transmission signal r(n) in the non-transmission interval Ta−Tra (s) of each of the Mth and (M+3)th transmission cycles (transmission cycles Ta).

In the transmission interval Trb (s) of each of (M+1)th and (M+4)th transmission cycles (transmission cycles Tb), $N_0$ samples exist per pulse code for the code sequence B1 having the pulse code length Lb. In the non-transmission interval Tb−Trb (s) of each transmission cycle Tb, Nb samples exist as a baseband transmission signal r(n).

In the transmission interval Trb (s) of each of (M+2)th and (M+5)th transmission cycles (transmission cycles Tb), $N_0$ samples exist per pulse code for the code sequence B2 having the pulse code length Lb. In the non-transmission interval Tb−Trb (s) of each transmission cycle Tb, Nb samples exist as a baseband transmission signal r(n).

In relation to the fact that the code sequences B1 and B2 are complementary code sequences, a transmission cycle 2Tb× Zc may be repeated which is equal to an integer Zc times a unit cycle that is a connection of the (M+1)th transmission cycle (transmission cycle Tb) and the (M+2)th transmission cycle (transmission cycle Tb). For example, high-frequency transmission signals generated according to the code sequences B1, B2, B1, and B2 are transmitted in the (M+1)th, (M+2)th, (M+3)th, and (M+4)th transmission cycles, respectively. Although each embodiment described below employs code sequences for the two measurement distance ranges (long-distance and short-distance ranges), a modification is possible in which a measurement distance range is subdivided and an additional code sequence(s) having a different code length(s) is used (transmitted).

The configurations of the individual units of the radar transmitter 2 will be described below. The following description will be directed to a case that switching is made among the code sequences A, B1, and B2 every transmission cycle Ta or Tb (all of the parameters Za, Zb1, and Zb2 are equal to 1). However, as already described above, each of the parameters Za, Zb1, and Zb2 is not limited to 1.

The first code generator 5 generates a transmission code for pulse compression of a code sequence A having the pulse code length La. A Barker code sequence, an M-sequence code, or the like is used as this transmission code for pulse compression. The first code generator 5 outputs the generated transmission code of the code sequence A to the code inverter 8 and the transmission code switch 9. In the following, for the sake of convenience, the transmission code of the code sequence A will be referred to as a transmission code A.

The second code generator 6 and the third code generator 7 generate transmission codes for pulse compression of the code sequences B1 and B2 having the pulse code length L, respectively. Code sequences B1 and B2 which are a pair of complementary codes are used as these transmission codes for pulse compression. The second code generator 6 outputs the generated transmission code of the code sequence B1 to the transmission code switch 9. The third code generator 7 outputs the generated transmission code of the code sequence B2 to the transmission code switch 9. In the following, for the sake of convenience, the transmission code of the code sequence B1 and the transmission code of the code sequence B2 will be referred to as transmission codes B1 and B2, respectively.

The coder inverter 8 receives the transmission code A that is output from the first code generator 5, and generates a transmission code of a code sequence −A which is a sign-inverted version of the received transmission code A. For example, where a Barker code having a code length La=7 is used as the transmission code A, the transmission code A is [1, 1, 1, −1, −1, 1, −1] and the generated code sequence −A is [−1, −1, −1, 1, 1, −1, 1]. The coder inverter 8 outputs the generated transmission code of the code sequence —A to the transmission code switch 9. In the following, for the sake of convenience, the transmission code of the code sequence −A will be referred to as a transmission code −A.

The transmission code switch 9 receives the transmission codes A, B1, B2, and −A which are output from the first code generator 5, the second code generator 6, the third code generator 7, and the coder inverter 8, respectively. The transmission code switch 9 switches to (selects) one of the received transmission codes A, −A, B1, and B2 according to a code switching control signal that is output from the transmission code controller 10, and outputs the selected transmission code to the modulator 11.

The transmission code controller 10 controls the transmission code switch 9 so that it switches to (selects) one of the plural transmission codes every transmission cycle Ta or Tb. More specifically, the transmission code controller 10 outputs a code switching control signal indicating how to switch to (select) one of the plural transmission codes every transmission cycle Ta or Tb. The transmission code controller 10 also outputs the code switching control signal to an input switch 23 of the radar receiver 3.

How the transmission code controller 10 operates will be described in a specific manner with reference to (a) of FIG. 2.

In the Mth transmission cycle (transmission cycle Ta), the transmission code controller 10 controls the transmission code switch 9 so that it outputs the transmission code A to the modulator 11. That is, in the Mth transmission cycle (transmission cycle Ta), the transmission code controller 10 outputs, to the transmission code switch 9, a code switching control signal to the effect that switching should be made to the transmission code A.

In the (M+1)th transmission cycle (transmission cycle Tb), the transmission code controller 10 controls the transmission code switch 9 so that it outputs the transmission code B1 to the modulator 11. That is, in the (M+1)th transmission cycle (transmission cycle Tb), the transmission code controller 10 outputs, to the transmission code switch 9, a code switching control signal to the effect that switching should be made to the transmission code B1.

In the (M+2)th transmission cycle (transmission cycle Tb), the transmission code controller 10 controls the transmission code switch 9 so that it outputs the transmission code B2 to the modulator 11. That is, in the (M+2)th transmission cycle (transmission cycle Tb), the transmission code controller 10 outputs, to the transmission code switch 9, a code switching control signal to the effect that switching should be made to the transmission code B2.

In the (M+3)th transmission cycle (transmission cycle Ta), the transmission code controller 10 controls the transmission code switch 9 so that it outputs the transmission code −A to the modulator 11. That is, in the (M+3)th transmission cycle (transmission cycle Ta), the transmission code controller 10 outputs, to the transmission code switch 9, a code switching control signal to the effect that switching should be made to the transmission code −A.

In the (M+4)th transmission cycle (transmission cycle Tb), the transmission code controller 10 controls the transmission code switch 9 so that it outputs the transmission code B1 to the modulator 11. That is, in the (M+4)th transmission cycle (transmission cycle Tb), the transmission code controller 10 outputs, to the transmission code switch 9, a code switching control signal to the effect that switching should be made to the transmission code B1.

In the (M+5)th transmission cycle (transmission cycle Tb), the transmission code controller 10 controls the transmission code switch 9 so that it outputs the transmission code B2 to the modulator 11. That is, in the (M+5)th transmission cycle (transmission cycle Tb), the transmission code controller 10 outputs, to the transmission code switch 9, a code switching control signal to the effect that switching should be made to the transmission code B2.

In the (M+6)th and following transmission cycles, the transmission codes suitable for the respective transmission cycles are generated and output to the transmission code switch 9 repeatedly in units of six transmission cycles corresponding to the Mth to (M+5)th transmission cycles shown in (a) of FIG. 2.

The modulator 11 receives the transmission code that is output from the transmission code switch 9. The modulator 11 generates a baseband transmission signal r(n) by pulse-modulating or phase-modulating the received transmission code. The modulator 11 produces a transmission signal r(n) that is a component in a preset restricted band or lower of the generated transmission signal using the LPF 12, and outputs it to the RF transmitter 13.

The RF transmitter 13 generates a signal by multiplying the reference signal generated by the reference oscillator Lo by a prescribed factor. The RF transmitter 13 operates according to the generated signal. More specifically, the frequency converter 14 receives the transmission signal r(n) generated by the transmission signal generator 4 and generates a high-frequency transmission signal in a carrier frequency band by up-converting the received baseband transmission signal r(n). The frequency converter 14 outputs the generated high-frequency transmission signal to the amplifier 15.

The amplifier 15 receives the thus-output high-frequency transmission signal, amplifies the received high-frequency transmission signal to a prescribed level, and outputs the amplified high-frequency transmission signal to the transmission antenna ANT0. The amplified high-frequency transmission signal is transmitted from the transmission antenna ANT0.

The transmission antenna ANT0 transmits (i.e., emits to the space) the high-frequency transmission signal that is output from the RF transmitter 13. As shown in (a) of FIG. 2, the high-frequency transmission signal is transmitted in the transmission interval Tra or Trb of the transmission cycle Ta or Tb and is not transmitted in the non-transmission interval (Ta−Tra) or (Tb−Trb).

Figure 3:
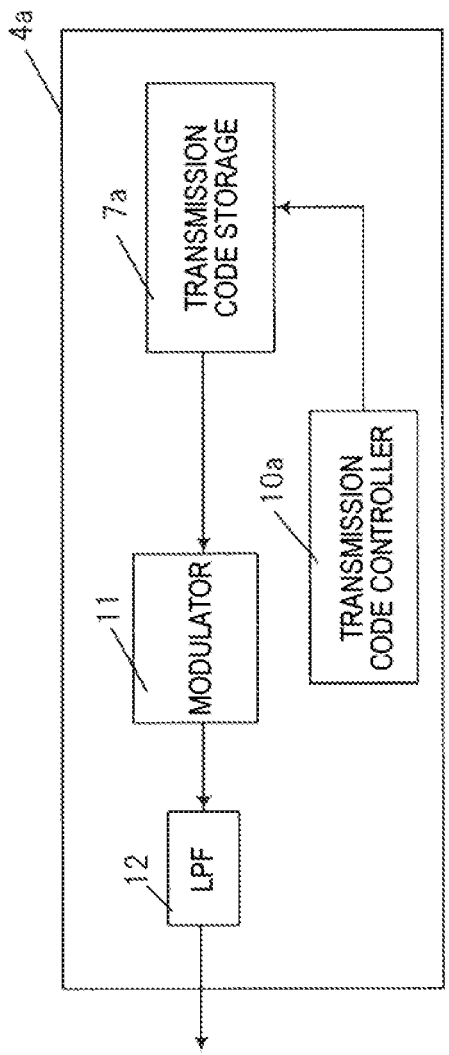
FIG. 3 is a block diagram showing the internal configuration of another transmission signal generator.

Instead of providing the transmission signal generator 4 with the above-described first code generator 5, second code generator 6, third code generator 7, code inverter 8, and transmission code switch 9, a transmission code storage 7a which stores, in advance, the transmission codes A, −A, B1, and B2 generated by the transmission signal generator 4 may be provided as shown in FIG. 3. The transmission code storage 7a shown in FIG. 3 can be used not only in the first embodiment but also in a second embodiment (described later). FIG. 3 is a block diagram showing another transmission signal generator 4a which is different from the transmission signal generator 4 shown in FIG. 1. The transmission signal generator 4a is configured so as to include the transmission code storage 7a, a transmission code controller 10a, a modulator 11, and an LPF 12.

Referring to FIG. 3, the transmission code controller 10a cyclically reads the transmission codes to be used in the transmission cycles Ta and Tb from the transmission code storage 7a and outputs them to the modulator 11. More specifically, in the Mth transmission cycle (transmission cycle Ta), the transmission code controller 10a reads the transmission code A from the transmission code storage 7a and outputs it to the modulator 11. In the (M+1)th transmission cycle (transmission cycle Tb), the transmission code controller 10a reads the transmission code B1 from the transmission code storage 7a and outputs it to the modulator 11. In the (M+2)th transmission cycle (transmission cycle Tb), the transmission code controller 10a reads the transmission code B2 from the transmission code storage 7a and outputs it to the modulator 11.

In the (M+3)th transmission cycle (transmission cycle Ta), the transmission code controller 10a reads the transmission code −A from the transmission code storage 7a and outputs it to the modulator 11. In the (M+4)th transmission cycle (transmission cycle Tb), the transmission code controller 10a reads the transmission code B1 from the transmission code storage 7a and outputs it to the modulator 11. In the (M+5)th transmission cycle (transmission cycle Tb), the transmission code controller 10a reads the transmission code B2 from the transmission code storage 7a and outputs it to the modulator 11. After the output of the transmission code to the modulator 11, the modulator 11 and the LPF 12 operate in the same manners as described above and hence no descriptions will be made in this respect.

Next, the radar receiver 3 will be described.

The radar receiver 3 is configured so as to include the reception antenna ANT1, an RF receiver 16, and a signal processor 20. The RF receiver 16 is configured so as to include an amplifier 17, a frequency converter 18, and a quadrature detector 19. The signal processor 20 is configured so as to include an A/D converter 21, an A/D converter 22, an input switch 23, a code inverter 24, a first correlation value calculator 25, a second correlation vale calculator 26, a third correlation vale calculator 27, a first average processor 28, a second average processor 29, and an incoming distance estimator 30.

The reception antenna ANT1 receives, as a reception signal, a signal of reflection waves produced as a result of reflection, by a target, of a high-frequency transmission signal transmitted from the radar transmitter 2 and noise signals produced around the radar apparatus 1. The signal of reflection waves is a signal in a high-frequency band. The reception signal received by the reception antenna ANT1 is input to the RF receiver 16. In the radar apparatus 1, the radar receiver has one reception antenna.

As shown in (b) of FIG. 2, the reception antenna ANT1 receives a reception signal in an interval corresponding to each of the Mth and (M+3)th transmission cycles (transmission cycles Ta). Furthermore, as shown in (b) of FIG. 2, the reception antenna ANT1 receives a reception signal in an interval corresponding to each of the (M+1)th, (M +2)th, (M+4)th, (M+5)th transmission cycles (transmission cycles Tb). Therefore, the reception signal receiving intervals Ta and Tb are measurement intervals of the radar apparatus 1.

The RF receiver 16 generates a signal by multiplying the reference signal generated by the reference oscillator Lo by a prescribed factor. The RF receiver 16 operates according to the generated signal. More specifically, the amplifier 17 receives the reception signal in the high-frequency band received by the reception antenna ANT1, amplifies the reception signal in the high-frequency band to a prescribed level, and outputs the amplified reception signal to the frequency converter 18.

The frequency converter 18 receives the reception signal in the high-frequency band that is output from the amplifier 17, down-converts the reception signal in the high-frequency band into a baseband signal, and outputs the down-converted reception signal to the quadrature detector 19.

The quadrature detector 19 generates a baseband reception signal comprising an in-phase signal and a quadrate signal by quadrature-detecting the baseband reception signal that is output from the frequency converter 18. The quadrature detector 19 outputs the in-phase signal and the quadrate signal of the generated reception signal to the A/D converters 21 and 22, respectively.

The A/D converter 21 converts the baseband in-phase signal (analog data) that is output from the quadrature detector 19 into digital data by sampling the former at discrete times $k_a$ or $k_b$. The A/D converter 21 outputs the converted in-phase signal (digital data) to the input switch 23.

Likewise, the A/D converter 22 converts the baseband quadrate signal (analog data) that is output from the quadrature detector 19 into digital data by sampling the former at the discrete times $k_a$ or $k_b$. The A/D converter 22 outputs the converted quadrate signal (digital data) to the input switch 23.

The parameter $k_a$ represents discrete times which correspond to the number of samples of the baseband transmission signal r(n) which is the source of a high-frequency transmission signal that is transmitted in the Mth or (M+3)th transmission cycle (transmission cycle Ta) shown in (a) of FIG. 2. The parameter $k_b$ represents discrete times which correspond to the number of samples of the baseband transmission signal r(n) which is the source of a high-frequency transmission signal that is transmitted in the (M+1)th, (M+2)th, (M+4)th, or (M+5)th transmission cycle (transmission cycle Tb) shown in (a) of FIG. 2.

Reception signals at the discrete times $k_a$ and $k_b$ produced by the A/D converters 21 and 22 are expressed as complex signals given by Equations (5) using in-phase signals $I(k_a)$ and $I(k_b)$ and quadrate signals $Q(k_a)$ and $Q(k_b)$ of the reception signals. The symbol j is the imaginary number unit which satisfies $j^2=-1$.

[Formulae 5]

$$x(k_a)=I(k_a)+jQ(k_a)$$

$$x(k_b)=I(k_b)+jQ(k_b) \quad (5)$$

In the following description, the discrete time $k_a$ varies from 1 to $(N_0La+Na-1)$. Alternatively, the discrete time $k_a$ may vary from 1 to $(N_0La+Na)$. The discrete time $k_b$ varies from 1 to $(N_0Lb+Nb-1)$. Alternatively, the discrete time $k_b$ may vary from 1 to $(N_0Lb+Nb)$. These ranges of the discrete times $k_a$ and $k_b$ are also applied to each embodiment described below.

As shown in (c) of FIG. 2, the discrete time $k_a=1$ represents a start time point of the transmission interval Tra of a transmission cycle Ta of a high-frequency transmission signal generated according to the transmission code A or −A. The discrete time $k_a=N_0La$ represents an end time point of the transmission interval Tra of a transmission cycle Ta of a high-frequency transmission signal generated according to the transmission code A or −A. The discrete time $k_a=N_0La+Na-1$ represents a time point immediately before the end of a transmission cycle Ta of a high-frequency transmission signal generated according to the transmission code A or −A.

On the other hand, as shown in (c) of FIG. 2, the discrete time $k_b=1$ represents a start time point of the transmission interval Trb of a transmission cycle Tb of a high-frequency transmission signal generated according to the transmission code B1 or B2. The discrete time $k_b=N_0Lb$ represents an end time point of the transmission interval Trb of a transmission cycle Tb of a high-frequency transmission signal generated according to the transmission code B1 or B2. The discrete time $k_b=N_0Lb+Nb-1$ represents a time point immediately before the end of a transmission cycle Tb of a high-frequency transmission signal generated according to the transmission code B1 or B2. In (c) of FIG. 2, for the sake of convenience, the range of the discrete time $k_a$ is shown only for the Mth transmission cycle and the range of the discrete time $k_b$ is shown only for the (M+2)th transmission cycle.

The radar receiver 3 performs calculations periodically in such a manner that a 6-cycle transmission cycle (2Ta+4Tb) comprising the transmission cycles of high-frequency transmission signals generated according to the respective transmission codes A, B1, B2, −A, B1, and B2 is set as one signal processing interval of the signal processor 20.

The input switch 23 receives the code switching control signal that is output from the transmission code controller 10 and the complex signal $x(k_a)$ or $x(k_b)$ which comprises the in-phase signal and the quadrate signal (digital data) which are output from the A/D converters 21 and 22. The input switch 23 outputs the complex signal $x(k_a)$ or $x(k_b)$ which comprises the digital data which are output from the A/D converters 21 and 22, to one of the code inverter 24, the first correlation value calculator 25, the second correlation value calculator 26, and the third correlation value calculator 27 according to the received code switching control signal.

More specifically, if a code switching control signal to the effect that switching is about to be made to the transmission code A is output from the transmission code controller 10, the input switch 23 outputs, to the first correlation value calculator 25, the complex signal $x(k_a)$ of the digital data which are output from the A/D converters 21 and 22.

If a code switching control signal to the effect that switching is about to be made to the transmission code −A is output from the transmission code controller 10, the input switch 23 outputs, to the code inverter 24, the complex signal $x(k_a)$ of the digital data which are output from the A/D converters 21 and 22.

If a code switching control signal to the effect that switching is about to be made to the transmission code B1 is output from the transmission code controller 10, the input switch 23 outputs, to the second correlation value calculator 26, the complex signal $x(k_b)$ of the digital data which are output from the A/D converters 21 and 22.

If a code switching control signal to the effect that switching is about to be made to the transmission code B2 is output from the transmission code controller 10, the input switch 23 outputs, to the third correlation value calculator 27, the complex signal $x(k_b)$ of the digital data which are output from the A/D converters 21 and 22.

The code inverter 24 inverts the sign (plus or minus) of the baseband complex signal $x(k_a)$ that is output from the input switch 23, and outputs the inverted complex signal $-x(k_a)$ to the first correlation value calculator 25.

The first correlation value calculator 25 receives the complex signal $x(k_a)$ (digital data) that is output from the input switch 23 or the complex signal $-x(k_a)$ (digital data) that is output from the code inverter 24. In the following, for the sake of convenience, the complex signal $x(k_a)$ or $-x(k_a)$ received by the first correlation value calculator 25 will be written as $y(k_a)$. Therefore, the complex signal $y(k_a)$ is the complex signal $x(k_a)$ or $-x(k_a)$.

Like the transmission signal generator 4, the first correlation value calculator 25 generates a signal by multiplying the reference signal generated by the reference oscillator Lo by a prescribed factor. This first correlation value calculator 25 does this in synchronism with the transmission signal generator 4. In FIG. 1, input of the reference signal to the first correlation value calculator 25 is omitted. The first correlation value calculator 25 generates elements of the same baseband reference transmission signal r(n) as generated by the transmission signal generator 4, periodically at the discrete times $k_a$ according to the generated signal.

Furthermore, the first correlation value calculator 25 calculates correlation values between the complex signal $y(k_a)$ that is output from the input switch 23 or the code inverter 24 and the generated reference transmission signal r(n). In this calculation of correlation values, complex conjugate values of the reference transmission signal r(n) are used.

More specifically, in the Mth or (M+1)th transmission cycle (transmission cycle Ta) shown in FIG. 2, that is, at the discrete times $k_a=1$ to $(N_0La+Na-1)$, the first correlation value calculator 25 calculates correlation values $AC_1(k_a)$ according to Equation (6). The first correlation value calculator 25 outputs the correlation values $AC_1(k_a)$ calculated according to Equation (6) to the first average processor 28.

[Formula 6]

$$AC_1(k_a) = \sum_{m=1}^{N_0 L_a} y(k_a + m - 1)r^*(m) \qquad (6)$$

The second correlation value calculator 26 receives the complex signal $x(k_b)$ (digital data) that is output from the input switch 23. In the following, for the sake of convenience, the complex signal received by the second correlation value calculator 26 will be written as $y(k_b)$.

Like the transmission signal generator 4, the second correlation value calculator 26 generates a signal by multiplying the reference signal generated by the reference oscillator Lo by a prescribed factor. This second correlation value calculator 26 does this in synchronism with the transmission signal generator 4. In FIG. 1, input of the reference signal to the second correlation value calculator 26 is omitted. The second correlation value calculator 26 generates elements of the same baseband reference transmission signal r(n) as generated by the transmission signal generator 4, periodically at the discrete times $k_b$ according to the generated signal.

Furthermore, the second correlation value calculator 26 calculates correlation values between the complex signal $y(k_b)$ that is output from the input switch 23 and the generated reference transmission signal r(n). In this calculation of correlation values, complex conjugate values of the reference transmission signal r(n) are used.

More specifically, in the (M+1)th or (M+4)th transmission cycle (the transmission cycle Tb) shown in FIG. 2, that is, at the discrete times $k_b=1$ to $(N_0Lb+Nb-1)$, the second correlation value calculator 26 calculates correlation values $AC_2(k_b)$ according to Equation (7). The second correlation value calculator 26 outputs the correlation values $AC_2(k_b)$ calculated according to Equation (7) to the second average processor 29.

[Formula 7]

$$AC_2(k_b) = \sum_{m=1}^{N_0 L_b} y(k_b + m - 1)r^*(m) \qquad (7)$$

The third correlation value calculator 27 receives the complex signal $x(k_b)$ (digital data) that is output from the input switch 23. In the following, for the sake of convenience, the complex signal received by the third correlation value calculator 27 will be written as $y(k_b)$.

Like the transmission signal generator 4, the third correlation value calculator 27 generates a signal by multiplying the reference signal generated by the reference oscillator Lo by a prescribed factor. This third correlation value calculator 27 does this in synchronism with the transmission signal generator 4. In FIG. 1, input of the reference signal to the third correlation value calculator 27 is omitted. The third correlation value calculator 27 generates elements of the same baseband reference transmission signal r(n) as generated by the transmission signal generator 4, periodically at the discrete times $k_b$ according to the generated signal.

Furthermore, the third correlation value calculator 27 calculates correlation values between the complex signal $y(k_b)$ that is output from the input switch 23 and the generated reference transmission signal r(n). In this calculation of correlation values, complex conjugate values of the reference transmission signal r(n) are used.

More specifically, in the (M+2)th or (M+5)th transmission cycle (the transmission cycle Tb) shown in FIG. 2, that is, at the discrete times $k_b=1$ to $(N_0Lb+Nb-1)$, the third correlation value calculator 27 calculates correlation values $AC_3(k_b)$ according to Equation (8). The third correlation value calculator 27 outputs the correlation values $AC_3(k_b)$ calculated according to Equation (8) to the second average processor 29.

[Formula 8]

$$AC_3(k_b) = \sum_{m=1}^{N_0 L_b} y(k_b + m - 1)r^*(m) \qquad (8)$$

As described above, the first correlation value calculator 25 performs calculations at the discrete times $k_a=1$ to $(N_0La+Na-1)$. Each of the second correlation value calculator 26 and the third correlation value calculator 27 performs calculations at the discrete times $k_b=1$ to $(N_0Lb+Nb-1)$. However, with an assumption that the target as a measurement subject of the radar apparatus 1 exists in a range that is near the radar apparatus 1, the ranges of the discrete times $k_a$ and $k_b$ may be restricted further. With this measure, the calculation amount of each of the first correlation value calculator 25, the second correlation value calculator 26, and the third correlation value calculator 27 can be reduced. That is, in the radar apparatus 1, the power consumption of the signal processor 20 can be reduced.

The first average processor 28 adds together the correlation values calculated according to Equation (6) between the reference transmission signals which are the same as the transmission signals generated according to the transmission code A or −A and the corresponding reception signals of reflection wave signals in repetitive (periodic) transmission cycles Ta.

More specifically, the first average processor 28 averages addition results of the correlation values $AC_1(k_a)$ calculated according to Equation (6) in periods of the discrete times $k_a=1$ to ($N_0$La+Na−1) shown in (c) of FIG. 2. The addition by the first average processor 28 is performed for each discrete time $k_a$.

The first average processor 28 may average correlation values which are addition and averaging results of plural units of correlation values, each unit comprising correlation values calculated in two transmission cycles Ta (2Ta) corresponding to the Mth and (M+3)th transmission cycles shown in FIG. 2. With this measure, noise components occurring around the radar apparatus 1 can be suppressed and its measurement performance relating to the estimation of an incoming angle and a distance of a target can be increased.

The second average processor 29 adds together the correlation values calculated according to Equation (7) or (8) between the reference transmission signals which are the same as the transmission signals generated according to the transmission code B1 or B2 and the corresponding reception signals of reflection wave signals in repetitive (periodic) transmission cycles Tb.

More specifically, the second average processor 29 averages addition results of the correlation values $AC_2(k_b)$ or $AC_3(k_b)$ calculated according to Equations (7) or (8) in periods of the discrete times $k_b$=1 to ($N_0$Lb+Nb−1) shown in (c) of FIG. 2. The addition by the second average processor 29 is performed for each discrete time $k_b$ of transmission cycles Tb corresponding to each of the (M+1)th, (M+2)th, (M+4)th, and (M+5)th transmission cycles shown in FIG. 2.

That is, the second average processor 29 adds together the correlation values calculated in transmission cycles Tb corresponding to each of the (M+1)th, (M+2)th, (M+4)th, and (M+5)th transmission cycles. With this measure, noise components occurring around the radar apparatus 1 can be suppressed and its measurement performance relating to the estimation of an incoming angle and a distance of a target can be increased. Furthermore, since the transmission codes B1 and B2 are a pair of codes constituting a complementary code, by virtue of the second average processor 28, the radar apparatus 1 can produce a signal in which range sidelobes are suppressed to low levels.

The incoming distance estimator 30 receives the addition results calculated by the first average processor 28 and the addition results calculated by the second average processor 29. The incoming distance estimator 30 performs a calculation for estimating a distance to a target on the basis of the received addition results. The calculation for estimating a distance to a target which is performed by the incoming distance estimator 30 is a known technique, and can be realized by referring to the following Non-patent document 1, for example:

(Non-patent document 1) J. J. Bussgang et al., "A Unified Analysis of Range Performance of CW, Pulse, and Pulse Doppler Radar," Proceedings of the IRE, Vol.

47, Issue 10, pp. 1,753-1,762 (1959).

For example, the incoming distance estimator 30 determines a time difference between the high-frequency transmission signal transmission time and a discrete time at which the correlation values of the addition results calculated by each of the first average processor 28 and the second average processor 29 takes a maximum value. Furthermore, the incoming distance estimator 30 estimates a distance to a target on the basis of the determined time difference.

Advantages of the radar apparatus 1 according to the first embodiment will be described with reference to FIG. 4. FIG. 4 is explanatory diagrams showing a calculation result of cross-correlation between the transmission code A having a short code length and the transmission code B1 having a long code length. In FIG. 4, (a) shows a calculation result Xcorr(A, B1, s) of cross-correlation between the transmission code A and the transmission code B1. In FIG. 4, (b) shows a calculation result Xcorr(A, −B1, s) of cross-correlation between the transmission code −A and the transmission code B1. In FIG. 4, (c) shows an addition result Xcorr(A, B1, s) +Xcorr (A, −B1, s) of the calculation result of cross-correlation between the transmission code A and the transmission code B1 and the calculation result of cross-correlation between the transmission code −A and the transmission code B1.

A cross-correlation calculation result Xcorr($x_n$, $y_n$, s) is given by Equation (9) ($x_n$ is equal to 0 when n>La or n<1 and $y_n$ is equal to 0 when n>Lb or n<1). The asterisk * is a complex conjugate operator. The parameter s represents the delay time or shift time.

[Formula 9]

$$X_{corr}(x_n, y_n, s) = \sum_{n=1}^{N_0 Lb} y_n x^*_{n+\tau} \qquad (9)$$

Assume that as shown in (a) in FIG. 4 there is inter-code interference between a signal of reflection waves that are received in the Mth transmission cycle (transmission cycle Ta) and a high-frequency transmission signal that is transmitted in the (M+1)th transmission cycle (transmission cycle Tb). That is, noise components exist in a cross-correlation value characteristic between the transmission codes A and B1 shown in (a) in FIG. 4 (horizontal axis: shift time (s)). The signal of reflection waves received in the Mth transmission cycle (transmission cycle Ta) is a signal of reflection waves of a high-frequency transmission signal generated according to the transmission code A. The high-frequency transmission signal transmitted in the (M+1)th transmission cycle (transmission cycle Tb) is a high-frequency transmission signal generated according to the transmission code B1.

Also assume that as shown in (b) in FIG. 4 there is inter-code interference between a signal of reflection waves that are received in the (M+3)th transmission cycle (transmission cycle Ta) and a high-frequency transmission signal that is transmitted in the (M+4)th transmission cycle (transmission cycle Tb). That is, noise components exist in a cross-correlation value characteristic between the transmission codes −A and B1 shown in (b) in FIG. 4 (horizontal axis: shift time (s)). The signal of reflection waves received in the (M+3)th transmission cycle (transmission cycle Ta) is a signal of reflection waves of a high-frequency transmission signal generated according to the transmission code −A. The high-frequency transmission signal transmitted in the (M+4)th transmission cycle (transmission cycle Tb) is a high-frequency transmission signal generated according to the transmission code B1.

As described above, the second average processor 29 adds together the correlation values corresponding to the transmission code B1 that are calculated at the discrete times $k_b$=1 to ($N_0$Lb+Nb−1) in the (M+1)th and (M+4)th transmission cycles (two transmission cycles). As a result of the addition of the correlation values calculated in the (M+1)th transmission cycle and the correlation values calculated in the (M+4)th transmission cycle (two transmission cycles), the cross-correlation value characteristic shown in (a) in FIG. 4 and that shown in (b) in FIG. 4 are added together.

As shown in (c) in FIG. 4, the resulting cross-correlation value characteristic has no noise components. That is, in the radar apparatus 1, since the correlation values corresponding to the transmission code B1 that are calculated at the discrete times $k_b$=1 to ($N_0$Lb+Nb−1) in the (M+1)th and (M+4)th transmission cycles (two transmission cycles) are added together, inter-code interference can be suppressed in signal processing intervals of the signal processor 20. Furthermore, in the radar apparatus 1, since the transmission cycle of the transmission codes A and −A having the short code length is set shorter than that of the transmission codes B1 and B2 having the large code length, the measurement time of measurements for all measurement distance ranges can be shortened.

As a result, in the radar apparatus 1 according to the first embodiment, even in the case where inter-code interference occurs because reflection waves corresponding to a transmission code transmitted in a short transmission cycle Ta are mixed into a signal in the ensuing long transmission cycle, such interference can be suppressed. Therefore, the reception dynamic range can be narrowed while the measurement distance range is increased by using a transmission code having a short code length that is transmitted in short transmission cycles Ta is used for measurement of a target that is relatively close to the radar apparatus and a transmission code having a long code length that is transmitted in long transmission cycles Tb is used for measurement of a target that is relatively distant from the radar apparatus. Furthermore, in the radar apparatus 1, since the measurement time of measurements for all measurement distance ranges can be shortened, the movement followability of a measurement of even a moving target can be increased.

Modification 1 of Embodiment 1

The first embodiment is directed to the case that the parameter Za which is an integer by which the transmission cycle Ta is to be multiplied and the parameters Zb1 and Zb2 which are integers by which the transmission cycle Tb is to be multiplied are all equal to 1. That is, the first embodiment is directed to the case that as shown in FIG. 2 the transmission code A is used in the Mth transmission cycle (transmission cycle Ta), the transmission code B1 is used in the (M+1)th transmission cycle (transmission cycle Tb), and the transmission code B2 is used in the (M+2)th transmission cycle (transmission cycle Tb).

A first modification of the first embodiment is directed to a case that each of the parameters Za, Zb1, and Zb2 is not equal to 1 but equal to a natural number that is larger than or equal to 2.

More specifically, after a high-frequency transmission signal generated according to the transmission code A is transmitted in an Mth transmission cycle (transmission cycle Ta), high-frequency transmission signals generated according to the transmission code A are transmitted in transmission cycles Ta of the same kind as the Mth transmission cycle Ta until an (M+Za−1)th transmission cycle.

Then, in (M+Za)th to (M+Za+Zb1−1)th transmission cycles, high-frequency transmission signals generated according to the transmission code B1 are transmitted in transmission cycles Tb.

Then, in (M+Za+Zb1)th to (M+Za+Zb1+Zb2−1)th transmission cycles, high-frequency transmission signals generated according to the transmission code B2 are transmitted in transmission cycles Tb.

Subsequently, after a high-frequency transmission signal generated according to the transmission code −A is transmitted in an (M+Za+Zb1+Zb2)th transmission cycle (transmission cycle Ta), high-frequency transmission signals generated according to the transmission code −A are transmitted in transmission cycles Ta of the same kind as the (M+Za+Zb1+Zb2)th transmission cycle Ta until an (M+2Za+Zb1+Zb2−1)th transmission cycle.

Then, in (M+2Za+Zb1+Zb2)th to (M+2Za+2Zb1+Zb2−1)th transmission cycles, high-frequency transmission signals generated according to the transmission code B1 are transmitted in transmission cycles Tb.

Then, in (M+2Za+2Zb1+Zb2)th to (M+2Za+2Zb1+2Zb2−1)th transmission cycles, high-frequency transmission signals generated according to the transmission code B2 are transmitted in transmission cycles Tb.

In an (M+2Za+2Zb1+2Zb2)th transmission cycle and following transmission cycles, transmissions are repeated in units of transmission cycles corresponding to the Mth to (M+2Za+2Zb1+2Zb2−1)th transmission cycles.

In the first embodiment, a high-frequency transmission signal generated according to the transmission code B1 is transmitted in the (M+1)th transmission cycle (transmission cycle Tb) shown in FIG. 2 and a high-frequency transmission signal generated according to the transmission code B2 is transmitted in the next, (M+2)th transmission cycle (transmission cycle Tb). Transmission signals generated according to the transmission codes B1 and B2 which constitute a complementary code may be transmitted repeatedly Zc times (Zc: integer) in units of two transmission cycles corresponding to the (M+1)th and (M+2)th transmission cycles. In this case, the parameters Zc, Zb1, Zb2, and Tb satisfy Equation (10):

[Formula 10]

$$Zc = \frac{(Zb1 \times Tb) + (Zb2 \times Tb)}{2Tb} \quad (10)$$

The same advantages as in the first embodiment can be obtained even in the case where high-frequency transmission signals generated according to the transmission codes are transmitted in the manner described in the first modification of the first embodiment.

Embodiment 21

Figure 5:
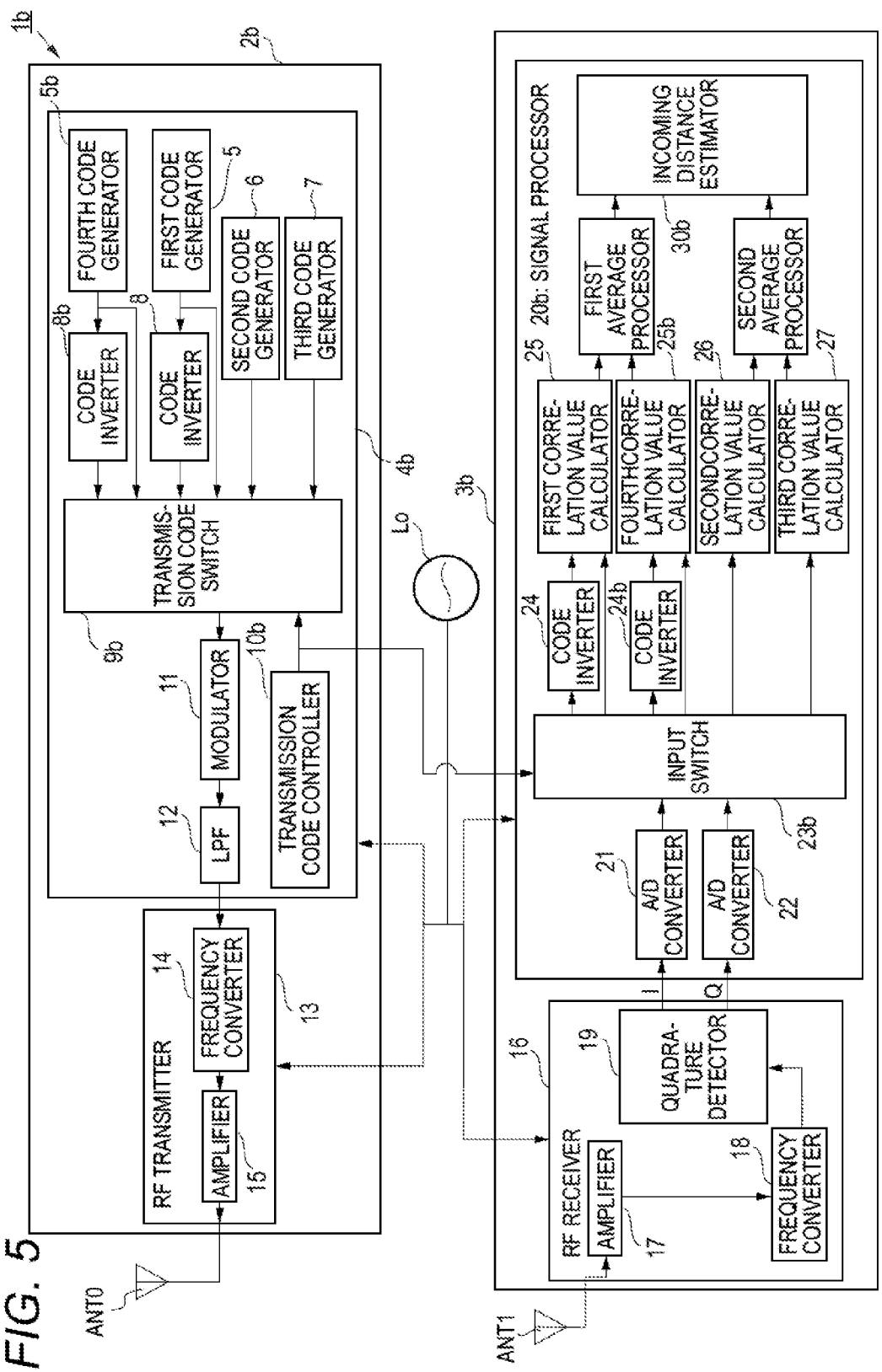
FIG. 5 is a block diagram showing the internal configuration of a radar apparatus according to a second embodiment.
Figure 6:
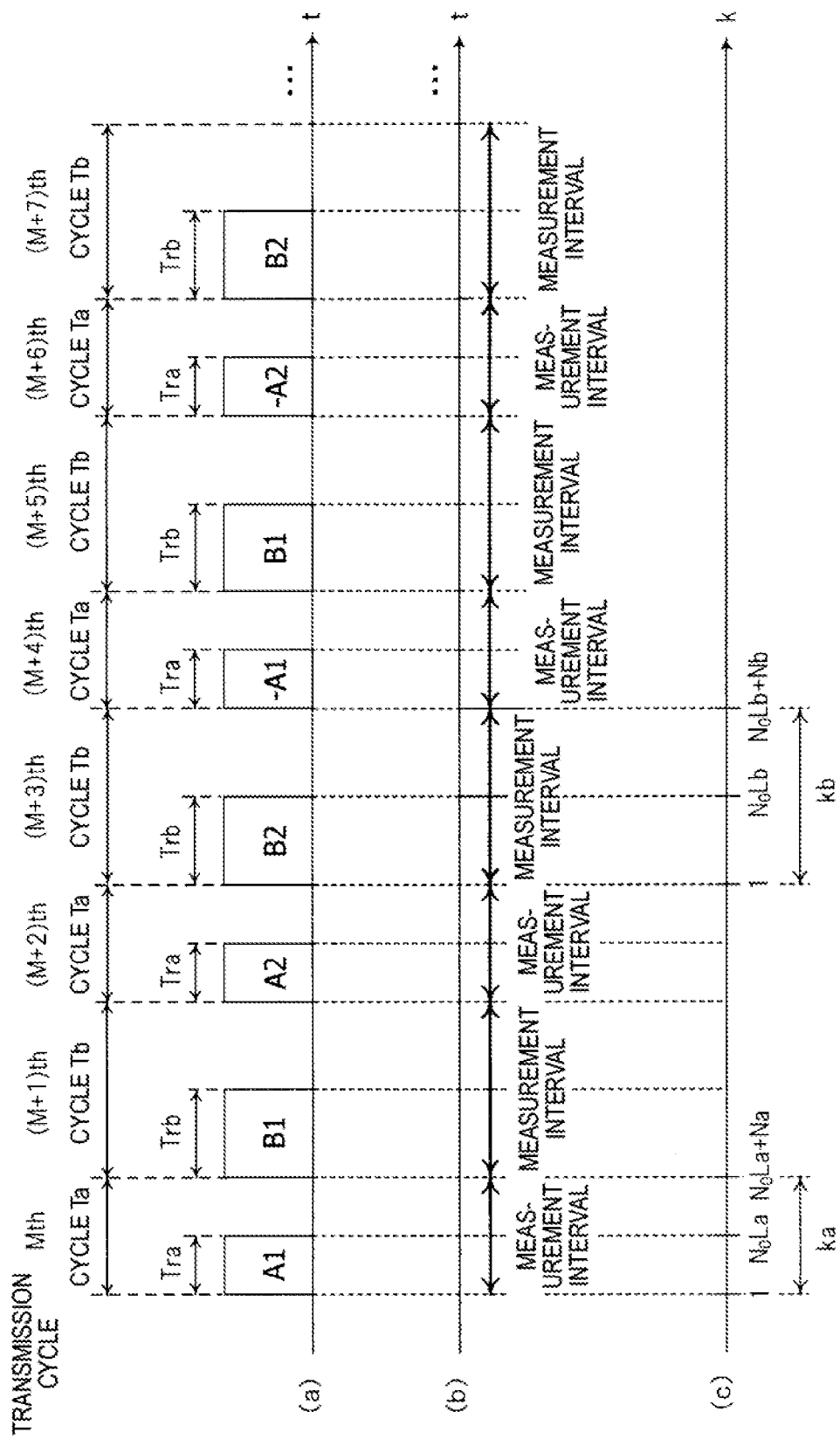
FIG. 6 is a timing chart illustrating how the radar apparatus according to the second embodiment operates; (a) in FIG. 6 is an explanatory diagram showing transmission cycles Ta, transmission cycles Tb, and transmission codes used in the respective transmission cycles, (b) in FIG. 6 is an explanatory diagram showing measurement intervals, and (c) in FIG. 6 is an explanatory diagram showing relationships between transmission cycles Ta and Tb and discrete times $k_a$ and $k_b$, respectively.

Next, the configuration and operation of a radar apparatus 1b according to a second embodiment will be described with reference to FIGS. 5 and 6. FIG. 5 is a block diagram showing the internal configuration of the radar apparatus 1B according to the second embodiment. FIG. 6 is a timing chart illustrating how the radar apparatus 1b according to the second embodiment operates. In FIG. 6, (a) is an explanatory diagram showing transmission cycles Ta, transmission cycles Tb, and transmission codes used in the respective transmission cycles. In FIG. 6, (b) is an explanatory diagram showing measurement intervals. In FIG. 6, (c) is an explanatory diagram showing relationships between transmission cycles Ta and Tb and discrete times $k_a$ and $k_b$, respectively.

In the following description of the second embodiment, parts of the configuration and operation that are different than in the first embodiment will be described and the same parts of the configuration and operation as in the first embodiment will not be described. In the first embodiment, a Barker code sequence, an M-sequence code, or the like is used as the transmission code A having a short code length. In the second embodiment, complementary codes A1 and A2 which are a pair of code sequences constituting a complementary code are used as transmission codes having a short code length.

As shown in FIG. 5, the radar apparatus 1b is configured so as to include a reference oscillator Lo, a radar transmitter 2b to which a transmission antenna ANT0 is connected, and a radar receiver 3b to which a reception antenna ANT1 is connected. The radar apparatus 1b transmits prescribed intermittent high-frequency transmission signals generated by the radar transmitter 2b from the transmission antenna ANT0, and receives signals of reflection waves reflected from a target by the reception antenna ANT1. The radar apparatus 1 detects the target on the basis of reception signals received by the radar receiver 3b.

The radar transmitter 2b will be described. The radar transmitter 2 is configured so as to include a transmission signal generator 4b and an RF transmitter 13. The transmission signal generator 4b is configured so as to include a first code generator 5, a second code generator 6, a third code generator 7, a fourth code generator 5b, a code inverter 8, a code inverter 8b, a transmission code switch 9b, a transmission code controller 10b, a modulator 11, and an LPF 12. Although in FIG. 5 the transmission signal generator 4b is configured so as to include the LPF 12, the LPF 12 may be provided in the radar transmitter 2 independently of the transmission signal generator 4b. The RF transmitter 13 is configured so as to include a frequency converter 14 and an amplifier 15.

The transmission signal generator 4b generates a signal by multiplying a reference signal generated by the reference oscillator Lo by a prescribed factor. The individual units of the transmission signal generator 4b operates according to the thus-generated signal. The transmission signal generator 4b switches among plural code sequences A1, A2, B1, and B2 having different pulse code lengths in units of a cycle that is equal to an integer (Za1, Za2, Zb1, Zb2: natural number) multiple of each of two transmission cycles Ta and Tb. The code sequence A1 or A2 is used in each transmission cycle Ta, and the code sequence B1 or B2 is used in each transmission cycle Tb. It is assumed that the code sequences A1 and A2 have the same code length and the code sequences B1 and B2 have the same code length.

Furthermore, a parameter La represents a pulse code length of the code sequences A1 and A2. A parameter Lb represents a pulse code length of the code sequences B1 and B2. The parameters La and Lb have a relationship La<Lb. The code sequences A1 and A2 are a pair of complementary code sequences (B1, B2). The code sequences B1 and B2 are a pair of complementary code sequences (B1, B2).

It is assumed that the transmission signal generator 4 generates uncontinuous signals. For example, as shown in (a) in FIG. 6, in the transmission interval Tra (s) of each of Mth and (M+2)th transmission cycles (transmission cycles Ta), $N_0$ samples exist per pulse code for the code sequence A1 or A2 having the pulse code length La. In the transmission interval Tra of each of (M+4)th and (M+6)th transmission cycles (transmission cycles Ta), $N_0$ samples exist per pulse code for the code sequence −A1 or −A2 having the pulse code length La.

It is assumed that Na samples exist as a baseband transmission signal r(n) in the non-transmission interval Ta−Tra (s) of each of the Mth, (M+2)th, (M+4)th, and (M +6)th transmission cycles (transmission cycles Ta).

In the transmission interval Trb (s) of each of (M+1)th and (M+5)th transmission cycles (transmission cycles Tb), $N_0$ samples exist per pulse code for the code sequence B1 having the pulse code length Lb. In the non-transmission interval Tb−Trb (s) of each transmission cycle Tb, Nb samples exist as a baseband transmission signal r(n).

In the transmission interval Trb (s) of each of (M+3)th and (M+7)th transmission cycles (transmission cycles Tb), $N_0$ samples exist per pulse code for the code sequence B2 having the pulse code length Lb. In the non-transmission interval Tb−Trb (s) of each transmission cycle Tb, Nb samples exist as a baseband transmission signal r(n).

Instead of the transmission cycle arrangement shown in FIG. 6, in relation to the fact that the code sequences A1 and A2 are complementary code sequences, a transmission cycle arrangement may be employed in which a transmission cycle Ta of the transmission code A1 and a transmission cycle Ta of the transmission code A2 are arranged continuously to constitute a transmission cycle 2Ta. Furthermore, a transmission cycle 2Ta×Zd may be repeated which is equal to an integer Zc times such a unit cycle, that is, a connection of two transmission cycles Ta. In addition, in relation to the fact that the code sequences B1 and B2 are complementary code sequences, a transmission cycle arrangement may be employed in which a transmission cycle Tb of the transmission code B1 and a transmission cycle Tb of the transmission code B2 are arranged continuously to constitute a transmission cycle 2Tb. Furthermore, a transmission cycle 2T×Ze may be repeated which is equal to an integer Zc times such a unit cycle, that is, a connection of two transmission cycles Tb.

Figure 7:
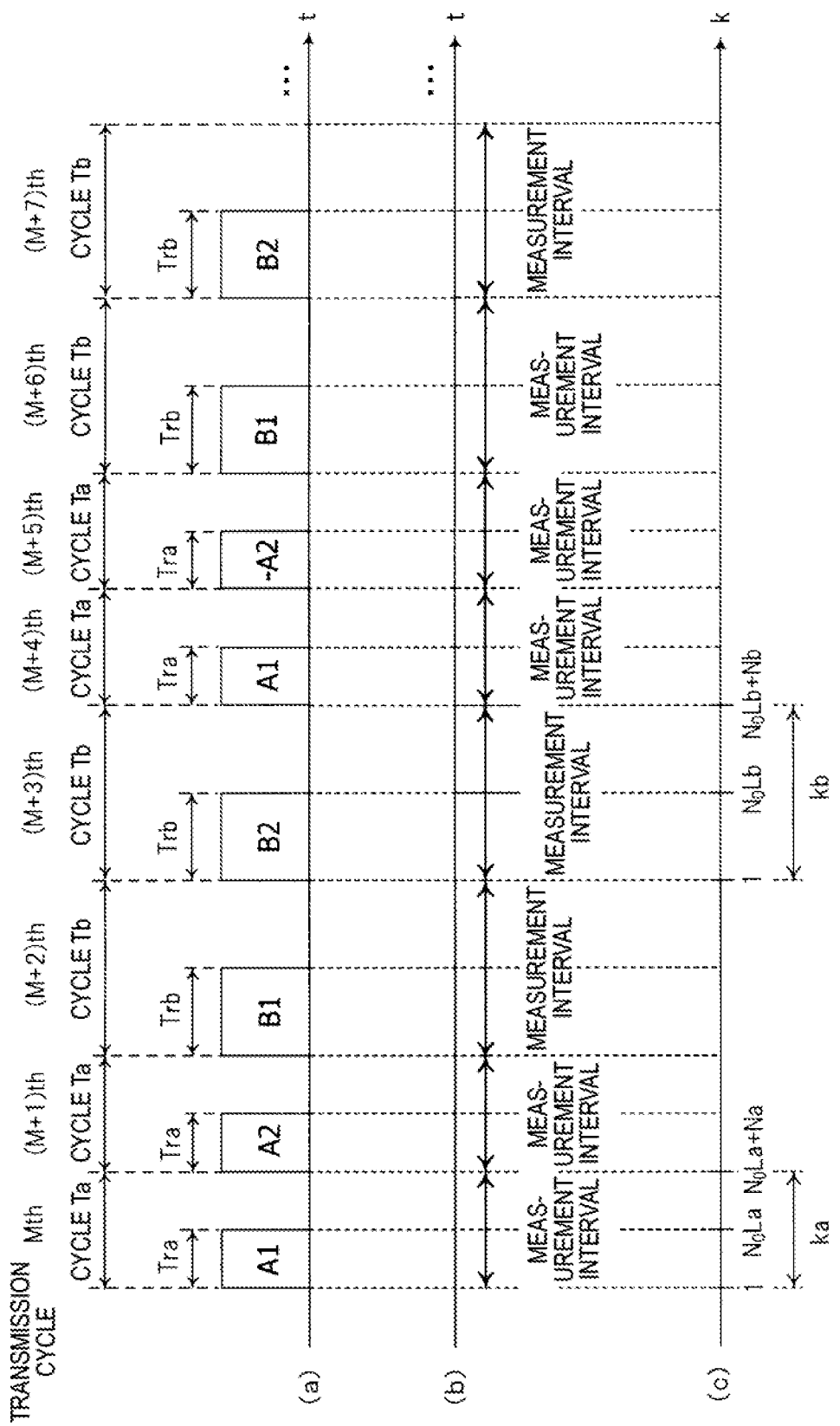
FIG. 7 is a timing chart illustrating how the radar apparatus according to the second embodiment operates in the case where a parameter Zd=1 and a parameter Ze=1; (a) in FIG. 7 is an explanatory diagram showing transmission cycles Ta, transmission cycles Tb, and transmission codes used in the respective transmission cycles, (b) in FIG. 7 is an explanatory diagram showing measurement intervals, and (c) in FIG. 7 is an explanatory diagram showing relationships between transmission cycles Ta and Tb and discrete times $k_a$ and $k_b$, respectively.
Figure 8:
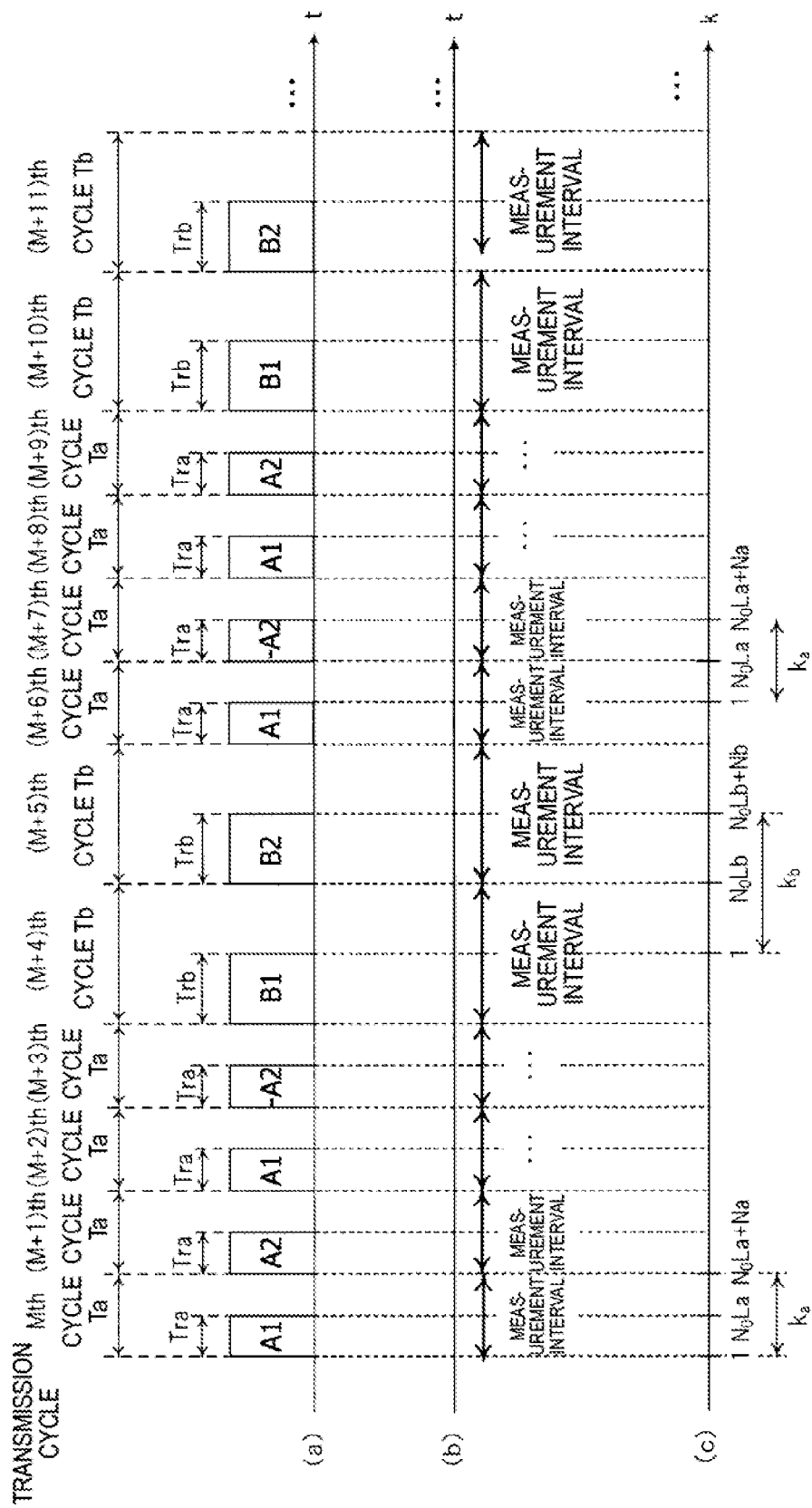
FIG. 8 is a timing chart illustrating how the radar apparatus according to the second embodiment operates in the case where a parameter Zd=2 and a parameter Ze=2; (a) in FIG. 8 is an explanatory diagram showing transmission cycles Ta, transmission cycles Tb, and transmission codes used in the respective transmission cycles, (b) in FIG. 8 is an explanatory diagram showing measurement intervals, and (c) in FIG. 8 is an explanatory diagram showing relationships between transmission cycles Ta and Tb and discrete times $k_a$ and $k_b$, respectively.

For example, FIG. 7 is a timing chart how the radar apparatus 1b operates in the case where the parameter Zd=1 and the parameter Ze=1. FIG. 8, is a timing chart how the radar apparatus 1b operates in the case where the parameter Zd=2 and the parameter Ze=2.

FIGS. 7(a) and 8(a) are explanatory diagrams showing transmission cycles Ta, transmission cycles Tb, and transmission codes used in the respective transmission cycles. FIGS. 7(b) and 8(b) are explanatory diagrams showing measurement intervals. FIGS. 7(c) and 8(c) are explanatory diagrams showing relationships between transmission cycles Ta and Tb and discrete times $k_a$ and $k_b$.

Referring to FIG. 7, let the Mth transmission cycle (transmission cycle Ta) to the (M+3)th transmission cycle (transmission cycles Tb) be called a first-half transmission cycle and let the (M+4)th transmission cycle (transmission cycle Ta) to the (M+7)th transmission cycle (transmission cycles Tb) be called a second-half transmission cycle.

When a transmission cycle of the transmission code A1 having the short pulse code length and a transmission cycle of the transmission code A2 having the short pulse code length are continuous with each other, inter-code interference occurs between a signal of reflection waves of the transmission code A1 and a transmission signal of the transmission code A2 according to a cross-correlation characteristic of the transmission codes A1 and A2. And, as described above, inter-code interference occurs according to a cross-correlation characteristic of the transmission codes A2 and B1 between a transmission cycle of the transmission code A2 having the short pulse code length and a transmission cycle of the transmission code B1 having the long pulse code length.

In view of the above, as shown in FIG. 7, in the second-half transmission cycle, a high-frequency transmission signal generated according to a code obtained by inverting the sign of one of the pair of code sequences A1 and A2 which constitute a complementary code is transmitted. More specifically, a high-frequency transmission signal generated according to a transmission code −A2 obtained by inverting the sign of the transmission code A2 is transmitted in the (M+5)th transmission cycle (transmission cycle Ta).

The signal processor performs the following processing. Correlation values calculated in the Mth transmission cycle (transmission cycle Ta) and correlation values calculated in the (M+4)th transmission cycle (transmission cycle Ta) are added together.

Correlation values calculated in the (M+1)th transmission cycle (transmission cycle Ta) and correlation values calculated in the (M+5)th transmission cycle (transmission cycle Ta) are added together. Correlation values calculated in the (M+2)th transmission cycle (transmission cycle Tb) and correlation values calculated in the (M+6)th transmission cycle (transmission cycle Tb) are added together. Correlation values calculated in the (M+3)th transmission cycle (transmission cycle Tb) and correlation values calculated in the (M+7)th transmission cycle (transmission cycle Tb) are added together.

Since correlation values calculated in a transmission cycle of the first-half transmission cycle and correlation values calculated in a transmission cycle of the second-half transmission cycle are added together, inter-code interference depending on the cross-correlation characteristic of the transmission codes A1 and A2 and inter-code interference depending on the cross-correlation characteristic of the transmission codes A2 and B1 can be suppressed.

Likewise, referring to FIG. 8, let the Mth transmission cycle (transmission cycle Ta) to the (M+5)th transmission cycle (transmission cycles Tb) be called a first-half transmission cycle and let the (M+6)th transmission cycle (transmission cycle Ta) to the (M+11)th transmission cycle (transmission cycles Tb) be called a second-half transmission cycle.

When a transmission cycle of the transmission code A1 having the short pulse code length and a transmission cycle of the transmission code A2 having the short pulse code length are continuous with each other, inter-code interference occurs between a signal of reflection waves of the transmission code A1 and a transmission signal of the transmission code A2 according to a cross-correlation characteristic of the transmission codes A1 and A2. And, as described above, inter-code interference occurs according to a cross-correlation characteristic of the transmission codes −A2 and B1 between a transmission cycle of the transmission code −A2 having the short pulse code length and a transmission cycle of the transmission code B1 having the long pulse code length.

In view of the above, as shown in FIG. 8, in the second-half transmission cycle, a high-frequency transmission signal generated according to a code obtained by inverting the sign of one of the pair of code sequences A1 and A2 which constitute a complementary code is transmitted. More specifically, a high-frequency transmission signal generated according to the transmission code −A2 obtained by inverting the sign of the transmission code A2 is transmitted in the (M+7)th transmission cycle (transmission cycle Ta). And a high-frequency transmission signal generated according to the transmission code A2 obtained by inverting the sign of the transmission code −A2 is transmitted in the (M+9)th transmission cycle (transmission cycle Ta).

The signal processor performs the following processing. Correlation values calculated in the Mth transmission cycle (transmission cycle Ta) and correlation values calculated in the (M+6)th transmission cycle (transmission cycle Ta) are added together. Correlation values calculated in the (M+1)th transmission cycle (transmission cycle Ta) and correlation values calculated in the (M+7)th transmission cycle (transmission cycle Ta) are added together. Correlation values calculated in the (M+2)th transmission cycle (transmission cycle Ta) and correlation values calculated in the (M+8)th transmission cycle (transmission cycle Ta) are added together. Correlation values calculated in the (M+3)th transmission cycle (transmission cycle Ta) and correlation values calculated in the (M+9)th transmission cycle (transmission cycle Ta) are added together. Correlation values calculated in the (M+4)th transmission cycle (transmission cycle Tb) and correlation values calculated in the (M+10)th transmission cycle (transmission cycle Tb) are added together. Correlation values calculated in the (M+5)th transmission cycle (transmission cycle Tb) and correlation values calculated in the (M+11)th transmission cycle (transmission cycle Tb) are added together.

Since correlation values calculated in a transmission cycle of the first-half transmission cycle and correlation values calculated in a transmission cycle of the second-half transmission cycle are added together, inter-code interference depending on the cross-correlation characteristic of the transmission codes A1 and A2 and inter-code interference depending on the cross-correlation characteristic of the transmission codes −A2 and B1 can be suppressed.

The configurations of the individual units of the radar transmitter 2b will be described below. The following description will be directed to a case that switching is made among the code sequences A1, A2, B1, and B2 every transmission cycle Ta or Tb (all of the parameters Za1, Za2, Zb1, and Zb2 are equal to 1). However, as already described above, each of the parameters Za1, Za2, Zb1, and Zb2 is not limited to 1.

The second code generator 6, the third code generator 7, and the code inverter 8 operate in the same manners as in the first embodiment, and hence no descriptions will be made as to how they operate.

The first code generator 5 and the fourth code generator 5b generate transmission codes for pulse compression of code sequences A 1 and A2 having the pulse code length La, respectively. Code sequences A1 and A2 which are a pair of complementary codes are used as these transmission codes for pulse compression. The first code generator 5 outputs the generated transmission code of the code sequence A1 to the code inverter 8 and the transmission code switch 9b. The fourth code generator 5b outputs the generated transmission code of the code sequence A2 to the code inverter 8b and the transmission code switch 9b. In the following, for the sake of convenience, the transmission code of the code sequence A1 and the transmission code of the code sequence A2 will be referred to as transmission codes A1 and A2, respectively.

The coder inverter 8 receives the transmission code A1 that is output from the first code generator 5, and generates a transmission code of a code sequence −A1 which is a sign-inverted version of the received transmission code A1. The coder inverter 8 outputs the generated transmission code of the code sequence −A1 to the transmission code switch 9b. In the following, for the sake of convenience, the transmission code of the code sequence −A1 will be referred to as a transmission code −A1.

The coder inverter 8b receives the transmission code A2 that is output from the first code generator 5b, and generates a transmission code of a code sequence −A2 which is a sign-inverted version of the received transmission code A2. The coder inverter 8b outputs the generated transmission code of the code sequence −A2 to the transmission code switch 9b. In the following, for the sake of convenience, the transmission code of the code sequence −A2 will be referred to as a transmission code −A2.

The transmission code switch 9b receives the transmission codes A1, B1, B2, A2, −A1, and −A2 which are output from the first code generator 5, the second code generator 6, the third code generator 7, the fourth code generator 5b, the coder inverter 8, and the code inverter 8b, respectively. The transmission code switch 9b switches to (selects) one of the received transmission codes A1, −A1, A2, −A2, B1, and B2 according to a code switching control signal that is output from the transmission code controller 10b, and outputs the selected transmission code to the modulator 11.

The transmission code controller 10b controls the transmission code switch 9b so that it switches to (selects) one of the plural transmission codes every transmission cycle Ta or Tb. More specifically, the transmission code controller 10b outputs a code switching control signal indicating how to switch to (select) one of the plural transmission codes every transmission cycle Ta or Tb. The transmission code controller 10b also outputs the code switching control signal to an input switch 23b of the radar receiver 3b.

How the transmission code controller 10b operates will be described in a specific manner with reference to (a) in FIG. 6.

In the Mth transmission cycle (transmission cycle Ta), the transmission code controller 10b controls the transmission code switch 9b so that it outputs the transmission code A1 to the modulator 11. That is, in the Mth transmission cycle (transmission cycle Ta), the transmission code controller 10b outputs, to the transmission code switch 9b, a code switching control signal to the effect that switching should be made to the transmission code A1.

In the (M+1)th transmission cycle (transmission cycle Tb), the transmission code controller 10b controls the transmission code switch 9b so that it outputs the transmission code B1 to the modulator 11. That is, in the (M+1)th transmission cycle (transmission cycle Tb), the transmission code controller 10b outputs, to the transmission code switch 9b, a code switching control signal to the effect that switching should be made to the transmission code B1.

In the (M+2)th transmission cycle (transmission cycle Ta), the transmission code controller 10b controls the transmission code switch 9b so that it outputs the transmission code A2 to the modulator 11. That is, in the (M+2)th transmission cycle (transmission cycle Ta), the transmission code controller 10b outputs, to the transmission code switch 9b, a code switching control signal to the effect that switching should be made to the transmission code A2.

In the (M+3)th transmission cycle (transmission cycle Tb), the transmission code controller 10b controls the transmission code switch 9b so that it outputs the transmission code B2 to the modulator 11. That is, in the (M+3)th transmission cycle (transmission cycle Tb), the transmission code controller 10b outputs, to the transmission code switch 9b, a code switching control signal to the effect that switching should be made to the transmission code B2.

In the (M+4)th transmission cycle (transmission cycle Ta), the transmission code controller 10b controls the transmission code switch 9b so that it outputs the transmission code −A1 to the modulator 11. That is, in the (M+4)th transmission cycle (transmission cycle Ta), the transmission code controller 10b outputs, to the transmission code switch 9b, a code switching control signal to the effect that switching should be made to the transmission code −A1.

In the (M+5)th transmission cycle (transmission cycle Tb), the transmission code controller 10b controls the transmission code switch 9b so that it outputs the transmission code B1 to the modulator 11. That is, in the (M+5)th transmission cycle (transmission cycle Tb), the transmission code controller 10b outputs, to the transmission code switch 9b, a code switching control signal to the effect that switching should be made to the transmission code B1.

In the (M+6)th transmission cycle (transmission cycle Ta), the transmission code controller 10b controls the transmission code switch 9b so that it outputs the transmission code −A2 to the modulator 11. That is, in the (M+6)th transmission cycle (transmission cycle Ta), the transmission code controller 10b outputs, to the transmission code switch 9b, a code switching control signal to the effect that switching should be made to the transmission code −A2.

In the (M+7)th transmission cycle (transmission cycle Tb), the transmission code controller 10b controls the transmission code switch 9b so that it outputs the transmission code B2 to the modulator 11. That is, in the (M+7)th transmission cycle (transmission cycle Tb), the transmission code controller 10b outputs, to the transmission code switch 9b, a code switching control signal to the effect that switching should be made to the transmission code B2.

In the (M+8)th and following transmission cycles, the transmission codes suitable for the respective transmission cycles are generated and output to the transmission code switch 9b repeatedly in units of eight transmission cycles corresponding to the Mth to (M+7)th transmission cycles shown in (a) in FIG. 6.

The modulator 11, the LPF 12, the RF transmitter 13, and the transmission antenna ANT0 operate in the same manners as in the first embodiment, and hence no descriptions will be made as to how they operate.

Next, the radar receiver 3b will be described.

The radar receiver 3b is configured so as to include the reception antenna ANT1, an RF receiver 16, and a signal processor 20b. The RF receiver 16 is configured so as to include an amplifier 17, a frequency converter 18, and a quadrature detector 19. The signal processor 20b is configured so as to include an A/D converter 21, an A/D converter 22, an input switch 23b, a code inverter 24, a code inverter 24b, a first correlation value calculator 25, a second correlation vale calculator 26, a third correlation vale calculator 27, a fourth correlation vale calculator 25b, a first average processor 28b, a second average processor 29, and an incoming distance estimator 30b.

The reception antenna ANT1, the RF receiver 16, the A/D converter 21, and the A/D converter 22 operate in the same manners as in the first embodiment, and hence no descriptions will be made as to how they operate. The parameter $k_a$ represents discrete times which correspond to the number of samples of the baseband transmission signal r(n) which is the source of a high-frequency transmission signal that is transmitted in the Mth, (M+2)th, (M+4)th, or (M+6)th transmission cycle (transmission cycle Ta) shown in (a) in FIG. 6. The parameter $k_b$ represents discrete times which correspond to the number of samples of the baseband transmission signal r(n) which is the source of a high-frequency transmission signal that is transmitted in the (M+1)th, (M+3)th, (M+5)th, or (M+7)th transmission cycle (transmission cycle Tb) shown in (a) of FIG. 2.

In the second embodiment, as shown in (c) in FIG. 6, the discrete time $k_a=1$ represents a start time point of the transmission interval Tra of a transmission cycle Ta of a high-frequency transmission signal generated according to the transmission code A1, A2, −A1, or −A2. The discrete time $k_a=N_0La$ represents an end time point of the transmission interval Tra of a transmission cycle Ta of a high-frequency transmission signal generated according to the transmission code A1, A2, −A1, or −A2. The discrete time $k_a=N_0La+Na−1$ represents a time point immediately before the end of a transmission cycle Ta of a high-frequency transmission signal generated according to the transmission code A1, A2, −A1, or −A2.

On the other hand, as shown in (c) in FIG. 6, the discrete time $k_b=1$ represents a start time point of the transmission interval Trb of a transmission cycle Tb of a high-frequency transmission signal generated according to the transmission code B1 or B2. The discrete time $k_b=N_0Lb$ represents an end time point of the transmission interval Trb of a transmission cycle Tb of a high-frequency transmission signal generated according to the transmission code B1 or B2. The discrete time $k_b = N_0 Lb + Nb - 1$ represents a time point immediately before the end of a transmission cycle Tb of a high-frequency transmission signal generated according to the transmission code B1 or B2. In (c) in FIG. 6, for the sake of convenience, the range of the discrete time $k_a$ is shown only for the Mth transmission cycle and the range of the discrete time $k_b$ is shown only for the (M+3)th transmission cycle.

The radar receiver 3 performs calculations periodically in such a manner that an 8-cycle transmission cycle (4Ta+4Tb) comprising the transmission cycles of high-frequency transmission signals generated according to the respective transmission codes A1, B1, A2, B2, −A1, B1, −A2, and B2 is set as one signal processing interval of the signal processor 20b.

The input switch 23b receives the code switching control signal that is output from the transmission code controller 10b and the complex signal $x(k_a)$ or $x(k_b)$ which comprises the in-phase signal and the quadrate signal (digital data) which are output from the A/D converters 21 and 22. The input switch 23 outputs the complex signal $x(k_a)$ or $x(k_b)$ which comprises the digital data which are output from the A/D converters 21 and 22, to one of the code inverter 24, the code inverter 24b, the first correlation value calculator 25, the second correlation value calculator 26, and the third correlation value calculator 27, and the fourth correlation value calculator 25b according to the received code switching control signal.

More specifically, if a code switching control signal to the effect that switching is about to be made to the transmission code A1 is output from the transmission code controller 10b, the input switch 23b outputs, to the first correlation value calculator 25, the complex signal $x(k_a)$ of the digital data which are output from the A/D converters 21 and 22.

If a code switching control signal to the effect that switching is about to be made to the transmission code −A1 is output from the transmission code controller 10b, the input switch 23b outputs, to the code inverter 24, the complex signal $x(k_a)$ of the digital data which are output from the A/D converters 21 and 22.

If a code switching control signal to the effect that switching is about to be made to the transmission code A2 is output from the transmission code controller 10b, the input switch 23b outputs, to the fourth correlation value calculator 25b, the complex signal $x(k_a)$ of the digital data which are output from the A/D converters 21 and 22.

If a code switching control signal to the effect that switching is about to be made to the transmission code −A2 is output from the transmission code controller 10b, the input switch 23b outputs, to the code inverter 24b, the complex signal $x(k_a)$ of the digital data which are output from the A/D converters 21 and 22.

If a code switching control signal to the effect that switching is about to be made to the transmission code B1 is output from the transmission code controller 10b, the input switch 23b outputs, to the second correlation value calculator 26, the complex signal $x(k_b)$ of the digital data which are output from the A/D converters 21 and 22.

If a code switching control signal to the effect that switching is about to be made to the transmission code B2 is output from the transmission code controller 10b, the input switch 23b outputs, to the third correlation value calculator 27, the complex signal $x(k_b)$ of the digital data which are output from the A/D converters 21 and 22.

The code inverter 24, the first correlation value calculator 25, the second correlation value calculator 26, and third correlation value calculator 27 operate in the same manners as in the first embodiment, and hence no descriptions will be made as to how they operate.

The code inverter 24b inverts the sign (plus or minus) of the baseband complex signal $x(k_a)$ that is output from the input switch 23b, and outputs the inverted complex signal $-x(k_a)$ to the fourth correlation value calculator 25b.

The fourth correlation value calculator 25 receives the complex signal $x(k_a)$ (digital data) that is output from the input switch 23b or the complex signal $-x(k_a)$ (digital data) that is output from the code inverter 24b. In the following, for the sake of convenience, the complex signal $x(k_a)$ or $-x(k_a)$ received by the fourth correlation value calculator 25b will be written as $y(k_a)$. Therefore, the complex signal $y(k_a)$ is the complex signal $x(k_a)$ or $-x(k_a)$.

Like the transmission signal generator 4b, the fourth correlation value calculator 25b generates a signal by multiplying the reference signal generated by the reference oscillator Lo by a prescribed factor. This fourth correlation value calculator 25b does this in synchronism with the transmission signal generator 4b. In FIG. 5, input of the reference signal to the fourth correlation value calculator 25b is omitted. The fourth correlation value calculator 25b generates elements of the same baseband reference transmission signal r(n) as generated by the transmission signal generator 4b, periodically at the discrete times $k_a$ according to the generated signal.

Furthermore, the fourth correlation value calculator 25b calculates correlation values between the complex signal $y(k_a)$ that is output from the input switch 23b or the code inverter 24b and the generated reference transmission signal r(n). In this calculation of correlation values, complex conjugate values of the reference transmission signal r(n) are used.

More specifically, in the (M+2)th or (M+6)th transmission cycle (transmission cycle Ta) shown in FIG. 6, that is, at the discrete times $k_a=1$ to $(N_0 La+Na-1)$, the fourth correlation value calculator 25b calculates correlation values $AC_4(k_a)$ according to Equation (11). The fourth correlation value calculator 25b outputs the correlation values $AC_4(k_a)$ calculated according to Equation (11) to the first average processor 28b.

[Formula 11]

$$AC_4(k_a) = \sum_{m=1}^{N_0 La} y(k_a + m - 1) r^*(m) \quad (11)$$

As described above, each of the first correlation value calculator 25 and the fourth correlation value calculator 25b performs calculations at the discrete times $k_a=1$ to $(N_0 La+Na-1)$. Each of the second correlation value calculator 26 and the third correlation value calculator 27 performs calculations at the discrete times $k_b=1$ to $(N_0 Lb+Nb-1)$. However, with an assumption that the target as a measurement subject of the radar apparatus 1b exists in a range that is near the radar apparatus 1b, the ranges of the discrete times $k_a$ and $k_b$ may be restricted further. With this measure, the calculation amount of each of the first correlation value calculator 25, the second correlation value calculator 26, the third correlation value calculator 27, and the fourth correlation value calculator 25b can be reduced. That is, in the radar apparatus 1b, the power consumption of the signal processor 20b can be reduced.

The first average processor 28b adds together the correlation values calculated according to Equation (6) or (11) between the reference transmission signals which are the same as the transmission signals generated according to the transmission code A1, A2, −A1, or −A2 and the corresponding reception signals of reflection wave signals in repetitive (periodic) transmission cycles Ta.

More specifically, the first average processor 28b averages addition results of the correlation values $AC_1(k_a)$ or $AC_4(k_a)$ calculated according to Equation (6) or (7) in periods of the discrete times $k_a=1$ to $(N_0La+Na-1)$ shown in (c) in FIG. 6. The addition by the first average processor 28b is performed for each discrete time $k_a$ of transmission cycles Ta corresponding to each of the Mth, (M+2)th, (M+4)th, and (M+6)th transmission cycles.

The first average processor 28b may average correlation values which are addition and averaging results of plural units of correlation values, each unit comprising correlation values calculated in four transmission cycles Ta (4Ta) corresponding to the Mth, (M+2)th, (M+4)th and (M+6)th transmission cycles shown in FIG. 6. With this measure, noise components occurring around the radar apparatus 1b can be suppressed and its measurement performance relating to the estimation of an incoming angle and a distance of a target can be increased.

The second average processor 29 adds together the correlation values calculated according to Equation (7) or (8) between the reference transmission signals which are the same as the transmission signals generated according to the transmission code B1 or B2 and the corresponding reception signals of reflection wave signals in repetitive (periodic) transmission cycles Tb.

More specifically, the second average processor 29 averages addition results of the correlation values $AC_2(k_b)$ or $AC_3(k_b)$ calculated according to Equations (7) or (8) in periods of the discrete times $k_b=1$ to $(N_0Lb+Nb-1)$ shown in (c) in FIG. 6. The addition by the second average processor 29 is performed for each discrete time $k_b$ of transmission cycles Tb corresponding to each of the (M+1)th, (M+3)th, (M+5)th, and (M+7)th transmission cycles shown in FIG. 2.

That is, the second average processor 29 adds together the correlation values calculated in transmission cycles Tb corresponding to each of the (M+1)th, (M+3)th, (M+5)th, and (M+7)th transmission cycles. With this measure, noise components occurring around the radar apparatus 1b can be suppressed and its measurement performance relating to the estimation of an incoming angle and a distance of a target can be increased. Furthermore, inter-code inference, if any, occurring because reflection waves of the transmission code A or –A transmitted in a short transmission cycle Ta are mixed into a signal in the ensuing long transmission cycle Tb can be suppressed.

Furthermore, since the transmission codes B1 and B2 are a pair of codes constituting a complementary code, by virtue of the second average processor 29, the radar apparatus 1b can produce a signal in which range sidelobes are suppressed to low levels.

Still further, the second average processor 29 may average correlation values which are addition and averaging results of plural units of correlation values, each unit comprising correlation values calculated in four transmission cycles Ta (4Ta) corresponding to the (M+1)th, (M+3)th, (M+5)th and (M+7)th transmission cycles shown in FIG. 6. With this measure, noise components occurring around the radar apparatus 1b can be suppressed and its measurement performance relating to the estimation of an incoming angle and a distance of a target can be increased.

The incoming distance estimator 30b receives the addition results calculated by the first average processor 28b and the addition results calculated by the second average processor 29. The incoming distance estimator 30b performs a calculation for estimating a distance to a target on the basis of the received addition results. The calculation for estimating a distance to a target which is performed by the incoming distance estimator 30b is a known technique, and can be realized by referring to the above-mentioned Non-patent document 1, for example.

For example, the incoming distance estimator 30b determines a time difference between the high-frequency transmission signal transmission time and a discrete time at which the correlation values of the addition results calculated by each of the first average processor 28b and the second average processor 29 takes a maximum value. Furthermore, the incoming distance estimator 30b estimates a distance to a target on the basis of the determined time difference.

As a result, in the radar apparatus 1b according to the second embodiment, as in the radar apparatus 1 according to the first embodiment (described above with reference to FIG. 4), even in the case where inter-code interference occurs because reflection waves corresponding to a transmission code transmitted in a short transmission cycle Ta are mixed into a signal in the ensuing long transmission cycle, such interference can be suppressed.

Therefore, the reception dynamic range can be narrowed while the measurement distance range is increased by using a transmission code having a short code length that is transmitted in short transmission cycles Ta is used for measurement of a target that is relatively close to the radar apparatus and a transmission code having a long code length that is transmitted in long transmission cycles Tb is used for measurement of a target that is relatively distant from the radar apparatus.

Furthermore, in the radar apparatus 1b, since the measurement time of measurements for all measurement distance ranges can be shortened, the movement followability of a measurement of even a moving target can be increased.

More specifically, assume that there is inter-code interference between a signal of reflection waves received in the Mth transmission cycle (transmission cycle Ta) and a high-frequency transmission signal transmitted in the (M+1)th transmission cycle (transmission cycle Tb). The reflection wave signal received in the Mth transmission cycle (transmission cycle Ta) is a reflection wave signal of a high-frequency transmission signal generated according to the transmission code A1. The high-frequency transmission signal transmitted in the (M+1)th transmission cycle (transmission cycle Tb) is a high-frequency transmission signal generated according to the transmission code B1.

Also assume that there is inter-code interference between a signal of reflection waves received in the (M+4)th transmission cycle (transmission cycle Ta) and a high-frequency transmission signal transmitted in the (M+5)th transmission cycle (transmission cycle Tb). The reflection wave signal received in the (M+4)th transmission cycle (transmission cycle Ta) is a reflection wave signal of a high-frequency transmission signal generated according to the transmission code –A1. The high-frequency transmission signal transmitted in the (M+5)th transmission cycle (transmission cycle Tb) is a high-frequency transmission signal generated according to the transmission code B1.

Also assume that there is inter-code interference between a signal of reflection waves received in the (M+2)th transmission cycle (transmission cycle Ta) and a high-frequency transmission signal transmitted in the (M+3)th transmission cycle (transmission cycle Tb). The reflection wave signal received in the (M+2)th transmission cycle (transmission cycle Ta) is a reflection wave signal of a high-frequency transmission signal generated according to the transmission code A2. The high-frequency transmission signal transmitted in the (M+3)

th transmission cycle (transmission cycle Tb) is a high-frequency transmission signal generated according to the transmission code B2.

Furthermore, assume that there is inter-code interference between a signal of reflection waves received in the (M+6)th transmission cycle (transmission cycle Ta) and a high-frequency transmission signal transmitted in the (M+7)th transmission cycle (transmission cycle Tb). The reflection wave signal received in the (M+6)th transmission cycle (transmission cycle Ta) is a reflection wave signal of a high-frequency transmission signal generated according to the transmission code −A2. The high-frequency transmission signal transmitted in the (M+7)th transmission cycle (transmission cycle Tb) is a high-frequency transmission signal generated according to the transmission code B2.

The second average processor 29 adds together the correlation values corresponding to the transmission code B1 that are calculated at the discrete times $k_b=1$ to $(N_0Lb+Nb-1)$ in the two transmission cycles (two transmission cycles). Furthermore, the second average processor 29 adds together the correlation values corresponding to the transmission code B2 that are calculated at the discrete times $k_b=1$ to $(N_0Lb+Nb-1)$ in the (M+3)th and (M+7)th transmission cycles (two transmission cycles).

As a result of the addition of the correlation values calculated in the two transmission cycles, as shown in (c) in FIG. 4, a resulting cross-correlation value characteristic has no noise components. That is, in the radar apparatus 1b, since the correlation values corresponding to the transmission code B1 that are calculated at the discrete times $k_b=1$ to $(N_0Lb+Nb-1)$ in the (M+1)th and (M+5)th transmission cycles (two transmission cycles) are added together, inter-code interference can be suppressed in signal processing intervals of the signal processor 20b. Furthermore, in the radar apparatus 1b, since the correlation values corresponding to the transmission code B2 that are calculated at the discrete times $k_b=1$ to $(N_0Lb+Nb-1)$ in the (M+3)th and (M+7)th transmission cycles (two transmission cycles) are added together, inter-code interference can be suppressed in signal processing intervals of the signal processor 20b.

Still further, in the radar apparatus 1b, since the transmission cycle of the transmission codes A and −A having the short code length is set shorter than that of the transmission codes B1 and B2 having the large code length, the measurement time of measurements for all measurement distance ranges can be shortened.

Although the various embodiments have been described above with reference to the accompanying drawings, it goes without saying that the radar apparatus according to the invention is not limited to those examples. It is apparent to those skilled in the art that various changes and modifications can be conceived without departing from the scope of the claims, and the technical scope of the invention should naturally encompass them.

Although in the above-described first embodiment the signal processor 20 of the radar receiver 3 is equipped with the code inverter 24. However, a configuration is possible in which the signal processor 20 is not equipped with the code inverter 24. However, in this case, in calculating correlation values, the first correlation value calculator 25 inverts the sign of the complex signal $x(k_a)$ (digital data) that is output from the input switch 23. In this case, the signal processor 20 no longer needs to be with the code inverter 24 and hence the configuration of the signal processor 20 can be simplified. This also applied to the second embodiment in the same manner.

Although in the above-described first embodiment the signal processor 20 of the radar receiver 3 is equipped with the code inverter 24. However, a configuration is possible in which the signal processor 20 is not equipped with the code inverter 24. However, in this case, in doing averaging, the first average processor 28 inverts the sign of the correlation values $AC_1(k_a)$ that are output from first correlation value calculator 25. In this case, the signal processor 20 no longer needs to be with the code inverter 24 and hence the configuration of the signal processor 20 can be simplified. This also applied to the second embodiment in the same manner.

In the first and second embodiments, code sequences B1 and B2 which are a pair of code sequences constituting a complementary code are used as the pulse compression codes for a long-distance range. However, the pulse compression codes for a long-distance range are not limited to code sequences B1 and B2 which are a pair of code sequences constituting a complementary code. For example, a code sequence C such as a Barker code sequence, an M-sequence code, or the like having a greater code length than the code sequence A may be used. Two examples using a transmission code of a code sequence C will be described below with reference to FIGS. 9-12. For the sake of convenience, a transmission code of the code sequence C will be will be referred to as a transmission code C.

Example 1 using transmission code C

FIG. 9 is a timing chart illustrating how a radar apparatus 1c operates in which a code sequence C that is not one of code sequences constituting a complementary code is used as a code sequence having a large code length. In FIG. 9, (a) is an explanatory diagram showing transmission cycles Ta, transmission cycles Tb, and transmission codes used in the respective transmission cycles. In FIG. 9, (b) is an explanatory diagram showing measurement intervals. In FIG. 9, (c) is an explanatory diagram showing relationships between transmission cycles Ta and Tb and discrete times $k_a$ and $k_b$, respectively. FIG. 10 is a block diagram showing the internal configuration of the radar apparatus 1c.

Referring to FIG. 9, one or more transmission cycles Tb for transmission of high-frequency transmission signals generated according to the transmission code C are provided instead of the transmission cycles Tb for transmission of high-frequency transmission signals generated according to the transmission codes B1 and B2 (see FIG. 2). The range of the discrete times $k_b$ shown in FIG. 9 is the same as that of the discrete times $k_b$ used in the first embodiment (see FIG. 2).

In a radar transmitter 2c shown in FIG. 10, a transmission code A generated by a first code generator 5, an inverted transmission code −A produced by a code inverter 8, a transmission code C generated by a fifth code generator 5c, and an inverted transmission code −C produced by a code inverter 8 are input to a transmission code switch 9c.

When a code switching control signal to the effect that switching is about to be made to the transmission code C is output from a transmission code controller 10c, an input switch 23c of a radar receiver 3c outputs, to a fifth correlation value calculator 25c, a complex signal $x(k_b)$ (digital data) that is output from A/D converters 21 and 22.

When a code switching control signal to the effect that switching is about to be made to the transmission code −C is output from the transmission code controller 10c, the input switch 23c outputs, to a code inverter 24c, a complex signal $x(k_b)$ (digital data) that is output from the A/D converters 21 and 22. The fifth correlation value calculator 25c and a second average processor 29c operate in the same manners as the first correlation value calculator 25 and the first average processor 28 used in the first embodiment, respectively, and hence no descriptions will be made as to how they operate.

As such, the radar apparatus 1c can provide the same advantages as the above-described radar apparatus 1 according to the first embodiment.

Example 2 using transmission code C

FIG. 11 is a timing chart illustrating how a radar apparatus 1d operates in which a code sequence C that is not one of code sequences constituting a complementary code is used as a code sequence having a large code length. In FIG. 11, (a) is an explanatory diagram showing transmission cycles Ta and transmission cycles Tb. In FIG. 11, (b) is an explanatory diagram showing measurement intervals. In FIG. 11, (c) is an explanatory diagram showing relationships between transmission cycles Ta and Tb and discrete times $k_a$ and $k_b$, respectively. FIG. 12 is a block diagram showing the internal configuration of the radar apparatus 1d.

Referring to FIG. 11, one or more transmission cycles Tb for transmission of high-frequency transmission signals generated according to the transmission code C are provided instead of the transmission cycles Tb for transmission of high-frequency transmission signals generated according to the transmission codes B1 and B2 (see FIG. 6). The range of the discrete times $k_b$ shown in FIG. 11 is the same as that of the discrete times $k_b$ used in the second embodiment (see FIG. 6).

In a radar transmitter 2d shown in FIG. 12, a transmission code A1 generated by a first code generator 5, an inverted transmission code −A1 produced by a code inverter 8, a transmission code A2 generated by a fourth code generator 5b, an inverted transmission code −A1 produced by a code inverter 8, a transmission code C generated by a fifth code generator 5c, and an inverted transmission code −C produced by a code inverter 8 are input to a transmission code switch 9d.

When a code switching control signal to the effect that switching is about to be made to the transmission code C is output from a transmission code controller 10d, an input switch 23d of a radar receiver 3d outputs, to a fifth correlation value calculator 25c, a complex signal $x(k_b)$ (digital data) that is output from A/D converters 21 and 22.

When a code switching control signal to the effect that switching is about to be made to the transmission code −C is output from the transmission code controller 10c, the input switch 23d outputs, to a code inverter 24c, a complex signal $x(k_b)$ (digital data) that is output from the A/D converters 21 and 22. The fifth correlation value calculator 25c and a second average processor 29c operate in the same manners as the first correlation value calculator 25 and the first average processor 28 used in the first embodiment, respectively, and hence no descriptions will be made as to how they operate.

As such, the radar apparatus 1d can provide the same advantages as the above-described radar apparatus 1 according to the first embodiment.

The present application is based on the Japanese Patent Application No. 2010-195971 filed on Sep. 1, 2010, the disclosure of which is incorporated herein by reference.

INDUSTRIAL APPLICABILITY

The radar apparatus according to the invention can suppress inter-code interference, if any, due to mixing of reflection waves of a transmission code having a short transmission cycle into a signal in the ensuing, long transmission cycle. This makes it possible to use a transmission code having a short code length for measurement of a target that is relatively close to the radar device by sending it in short transmission cycles and to use a transmission code having a large code length for measurement of a target that is relatively distant the radar device by sending it in long transmission cycles. This makes it possible to suppress the reception dynamic range while increasing the measurement distance range. The radar apparatus according to the invention is useful as a radar apparatus which can shorten a measurement time that is necessary for a measurement involving plural measurement distance ranges.

DESCRIPTION OF SYMBOLS 1, 1b, 1 c, 1d: Radar apparatus
2, 2b, 2c, 2d: Radar transmitter
3, 3b, 3c, 2d: Radar receiver
4, 4a, 4b, 4c, 4d: Transmission signal generator
5: First code generator
5b: Fourth code generator
5c: Fifth code generator
6: Second code generator
7: Third code generator
7a: Transmission code storage
8, 8b, 8c: Code inverter
9, 9b, 9c, 9d: Transmission code switch
10, 10b, 10c, 10d: Transmission code controller
11: Modulator
13: RF transmitter
14, 18: Frequency converter
15, 17: Amplifier
16: RF receiver
19: Quadrature detector
20, 20b, 20c, 20d: Signal processor
21, 22: A/D converter
23, 23b, 23c, 23d: Input switch
24, 24b, 24c: Code inverter
25: First correlation value calculator
25b: Fourth correlation value calculator
25c: Fifth correlation value calculator
26: Second correlation value calculator
27: Third correlation value calculator
28, 28b: First average processor
29, 29c, 29d: Second average processor
30, 30b: Incoming distance estimator
ANT0: Transmission antenna
ANT1: Reception antenna
Lo: Reference oscillator
Ta, Tb: Transmission cycle
Tra, Trb: Transmission interval

What is claimed is:
1. A radar apparatus comprising:
a transmission signal generator which generates a first transmission signal in a first transmission cycle by modulating a first code sequence, generates a second transmission signal in a second transmission cycle by modulating a second code sequence, generates a third transmission signal in a third transmission cycle having the same length as the first transmission cycle by modulating a third code sequence that is obtained by multiplying the first code sequence and −1, and generates a fourth transmission signal in a fourth transmission cycle by modulating the second code sequence; and
an RF transmitter which converts the first, second, third, and fourth transmission signals generated by the transmission signal generator into respective high-frequency transmission signals, and transmits the high-frequency transmission signals from a transmission antenna.

2. The radar apparatus according to claim 1, wherein the second code sequence has a fourth code sequence and a fifth code sequence which are complementary to each other;

wherein in the transmission signal generator, the second transmission signal is a signal obtained by modulating the fourth code sequence, and the fourth transmission signal is a signal obtained by modulating the fourth code sequence;

wherein the transmission signal generator generates a fifth transmission signal in a fifth transmission cycle that is located between the second transmission cycle and the third transmission cycle and has the same length as the second transmission cycle by modulating the fifth code sequence, and generates a sixth transmission signal in a sixth transmission cycle that is located after the fourth transmission cycle and has the same length as the fourth transmission cycle by modulating the fifth code sequence; and wherein the RF transmitter converts the fifth and sixth transmission signals generated by the transmission signal generator into respective high-frequency transmission signals, and transmits the high-frequency transmission signals from the transmission antenna.

3. The radar apparatus according to claim 2, wherein the first code sequence has a sixth code sequence and a seventh code sequence which are complementary to each other;

wherein the third code sequence has an eighth code sequence which is obtained by multiplying the sixth code sequence and −1 and a ninth code sequence which is obtained by multiplying the seventh code sequence and −1;

wherein in the transmission signal generator, the first transmission signal is a signal obtained by modulating the sixth code sequence, and the third transmission signal is a signal obtained by modulating the ninth code sequence;

wherein the transmission signal generator generates a seventh transmission signal in a seventh transmission cycle that is located between the first transmission cycle and the second transmission cycle and has the same length as the first transmission cycle by modulating the seventh code sequence, and generates an eighth transmission signal in an eighth transmission cycle that is located between the fifth transmission cycle and the third transmission cycle and has the same length as the third transmission cycle by modulating the sixth code sequence; and wherein the RF transmitter converts the seventh and eighth transmission signals generated by the transmission signal generator into respective high-frequency transmission signals, and transmits the high-frequency transmission signals from the transmission antenna.

4. The radar apparatus according to claim 3, wherein the transmission signal generator generates a ninth transmission signal in a ninth transmission cycle which is located after the seventh transmission cycle and has the same length as the first transmission cycle by modulating the sixth code sequence, generates a 10th transmission signal in a 10th transmission cycle which is located between the ninth transmission cycle and the second transmission cycle and has the same length as the third transmission cycle by modulating the ninth code sequence, generates an 11th transmission signal in an 11th transmission cycle which is located after the third transmission cycle and has the same length as the first transmission cycle by modulating the sixth code sequence, and generates a 12th transmission signal in a 12th transmission cycle which is located between the 11th transmission cycle and the fourth transmission cycle and has the same length as the first transmission cycle by modulating seventh code sequence; and wherein the RF transmitter converts the ninth 10th, 11th and 12th transmission signals generated by the transmission signal generator into respective high-frequency transmission signals, and transmits the high-frequency transmission signals from the transmission antenna.

5. The radar apparatus according to claim 4, wherein a code length of the fourth, fifth and eighth code sequences is shorter than a code length of the sixth and seventh code sequences.

6. The radar apparatus according to claim 4, further comprising:

an RF receiver which converts reflection wave signals of the fifth, sixth, seventh, eighth, ninth, 10th, 11th and 12th transmission signals into baseband reception signals;

an input switch which selectively outputs the reception signal produced by the RF receiver by converting the reflection wave signal of one of the fifth, sixth, seventh, eighth, ninth, 10th, 11th and 12th transmission signals;

a first correlation value calculator which calculates first correlation values between the reception signal that is output from the input switch as corresponding to the fifth transmission signal and the fifth transmission signal generated by the transmission signal generator, and calculates second correlation values between the reception signal that is output from the input switch as corresponding to the ninth transmission signal and the ninth transmission signal generated by the transmission signal generator;

a second correlation value calculator which calculates third correlation values between the reception signals that are output from the input switch as corresponding to the sixth and 10th transmission signals and the sixth or 10th transmission signal generated by the transmission signal generator;

a third correlation value calculator which calculates fourth correlation values between the reception signals that are output from the input switch as corresponding to the eighth and 12th transmission signals and the eighth or 12th transmission signal generated by the transmission signal generator; and a fourth correlation value calculator which calculates fifth correlation values between the reception signal that is output from the input switch as corresponding to the seventh transmission signal and the seventh transmission signal generated by the transmission signal generator, and calculates sixth correlation values between the reception signal that is output from the input switch as corresponding to the 11th transmission signal and the 11th transmission signal generated by the transmission signal generator.

7. The radar apparatus according to claim 6, further comprising:

a first code inverter which inverts the sign of the ninth transmission signal that is output from the input switch; and a second code inverter which inverts the sign of the 11th transmission signal that is output from the input switch.

8. The radar apparatus according to claim 7, further comprising:

a first average processor which adds together the first correlation values and the second correlation values calculated by the first correlation value calculator, and adds together the fifth correlation values and the sixth correlation values calculated by the fourth correlation value calculator; and a second average processor which adds together the third correlation values calculated by the second correlation value calculator and the fourth correlation values calculated by the third correlation value calculator.

9. The radar apparatus according to claim 8, further comprising:

an incoming distance estimator which calculates an incoming distance of a target on the basis of an addition calculation result of the first average processor and an addition calculation result of the second average processor.

10. The radar apparatus according to claim 3, wherein a code length of the fourth, fifth, eighth and ninth code sequences is shorter than a code length of the sixth and seventh code sequences.

11. The radar apparatus according to claim 3, further comprising:

an RF receiver which converts reflection wave signals of the first, third, fifth, sixth, seventh and eighth transmission signals into baseband reception signals;

an input switch which selectively outputs the reception signal produced by the RF receiver by converting the reflection wave signal of one of the first, third, fifth, sixth, seventh and eighth transmission signals;

a first correlation value calculator which calculates first correlation values between the reception signal that is output from the input switch as corresponding to the first transmission signal and the first transmission signal generated by the transmission signal generator, and calculates second correlation values between the reception signal that is output from the input switch as corresponding to the third transmission signal and the third transmission signal generated by the transmission signal generator;

a second correlation value calculator which calculates third correlation values between the reception signals that are output from the input switch as corresponding to the fifth and seventh transmission signals and the fifth or seventh transmission signal generated by the transmission signal generator; and a third correlation value calculator which calculates fourth correlation values between the reception signals that are output from the input switch as corresponding to the sixth and eighth transmission signals and the sixth or eighth transmission signal generated by the transmission signal generator.

12. The radar apparatus according to claim 11, further comprising:

a code inverter which inverts the sign of the third transmission signal that is output from the input switch.

13. The radar apparatus according to claim 12, further comprising:

a first average processor which adds together the first correlation values and the second correlation values calculated by the first correlation value calculator; and a second average processor which adds together the third correlation values calculated by the second correlation value calculator and the fourth correlation values calculated by the third correlation value calculator.

14. The radar apparatus according to claim 13, further comprising:

an incoming distance estimator which calculates an incoming distance of a target on the basis of an addition calculation result of the first average processor and an addition calculation result of the second average processor.

15. The radar apparatus according to claim 14, further comprising:

an A/D converter which converts the reception signal produced by the RF receiver into digital data.

16. The radar apparatus according to claim 1, wherein the first code sequence has a sixth code sequence and a seventh code sequence which are complementary to each other;

wherein the third code sequence has an eighth code sequence which is obtained by multiplying the sixth code sequence a −1, and a ninth code sequence which is obtained by multiplying the seventh code sequence and −1;

wherein in the transmission signal generator, the first transmission signal is a signal obtained by modulating the sixth code sequence, and the third transmission signal is a signal obtained by modulating the eighth code sequence;

wherein the transmission signal generator generates 13th transmission signal in a 13th transmission cycle that is located after the first transmission cycle and has the same length as the second transmission cycle by modulating the second code sequence, generates a 14th transmission signal in a 14th transmission cycle that is located after the 13th transmission cycle and has the same length as the first transmission cycle by modulating the seventh code sequence, generates a 15th transmission signal in a 15th transmission cycle that is located after the fourth transmission cycle and has the same length as the first transmission cycle by modulating the ninth code sequence of the third code sequence, and generates 16th transmission signal in a 16th transmission cycle that is located after the 15th transmission cycle and has the same length as the second transmission cycle by modulating the second code sequence; and wherein the RF transmitter converts the 13th, 14th, 15th and 16th transmission signals generated by the transmission signal generator into respective high-frequency transmission signals, and transmits the high-frequency transmission signals from the transmission antenna.

17. The radar apparatus according to claim 16, wherein the second code sequence has a fourth code sequence and a fifth code sequence which are complementary to each other; and wherein in the transmission signal generator, the second transmission signal is a signal obtained by modulating the fifth code sequence, the fourth transmission signal is a signal obtained by modulating the fourth code sequence, the 13th transmission signal is a signal obtained by modulating the fourth code sequence, and the 16th is a signal obtained by modulating the fifth code sequence.

18. The radar apparatus according to claim 17, wherein a code length of the fourth, fifth, sixth and seventh code sequences is shorter than a code length of the second code sequence.

19. The radar apparatus according to claim 1, wherein the first and third transmission cycles are shorter than the second and fourth transmission cycles.

20. The radar apparatus according to claim 1, wherein a first code length of the first code sequence is shorter than a second code length of the second code sequence.

* * * * *